United States Patent
Alkalay et al.

(10) Patent No.: US 11,857,899 B2
(45) Date of Patent: Jan. 2, 2024

(54) SELF CLEANING DISC FILTER APPARATUS

(71) Applicant: TAVLIT PLASTIC LTD., Yavne (IL)

(72) Inventors: Uri Alkalay, Yavne (IL); Gilad Nahmias, Yavne (IL)

(73) Assignee: Plas-Fit Ltd., Misgav (IL)

( * ) Notice: Subject to any disclaimer, the term of this patent is extended or adjusted under 35 U.S.C. 154(b) by 426 days.

(21) Appl. No.: 17/053,775

(22) PCT Filed: May 8, 2019

(86) PCT No.: PCT/IL2019/050529
§ 371 (c)(1),
(2) Date: Nov. 8, 2020

(87) PCT Pub. No.: WO2019/215743
PCT Pub. Date: Nov. 14, 2019

(65) Prior Publication Data
US 2021/0220762 A1   Jul. 22, 2021

(30) Foreign Application Priority Data
May 8, 2018 (IL) .......................... 259218

(51) Int. Cl.
*B01D 29/46* (2006.01)
*B01D 29/68* (2006.01)
*B01D 35/157* (2006.01)
*B01D 35/30* (2006.01)

(52) U.S. Cl.
CPC .......... *B01D 29/46* (2013.01); *B01D 29/682* (2013.01); *B01D 35/1573* (2013.01); *B01D 35/306* (2013.01); *B01D 2201/54* (2013.01)

(58) Field of Classification Search
CPC .. B01D 29/46; B01D 29/682; B01D 35/1573; B01D 35/306; B01D 2201/54
See application file for complete search history.

(56) References Cited

U.S. PATENT DOCUMENTS

2016/0166954 A1* 6/2016 Peleg ..................... B01D 29/46
210/85

* cited by examiner

*Primary Examiner* — Waqaas Ali
(74) *Attorney, Agent, or Firm* — The Law Office of Joseph L. Felber

(57) ABSTRACT

A filtering apparatus (100) having a filtering mode and a self-cleaning mode, the apparatus provided for filtering an upstream flowing fluid with filtering elements (20) in the form of a plurality of stackable discs during filtering mode utilizing a first flow direction, apparatus (100) also configured to self-clean the filtering elements (20) the apparatus (100) including an internal fluid diverter (110, 210, 310) that is internal to the filter housing. The position of the internal fluid diverter determines the direction of fluid flow through the filter housing and the filter phase. The position of the internal fluid diverter is controlled with a controller disposed external to the filter housing that may be manipulated either manually or by automated means.

18 Claims, 20 Drawing Sheets

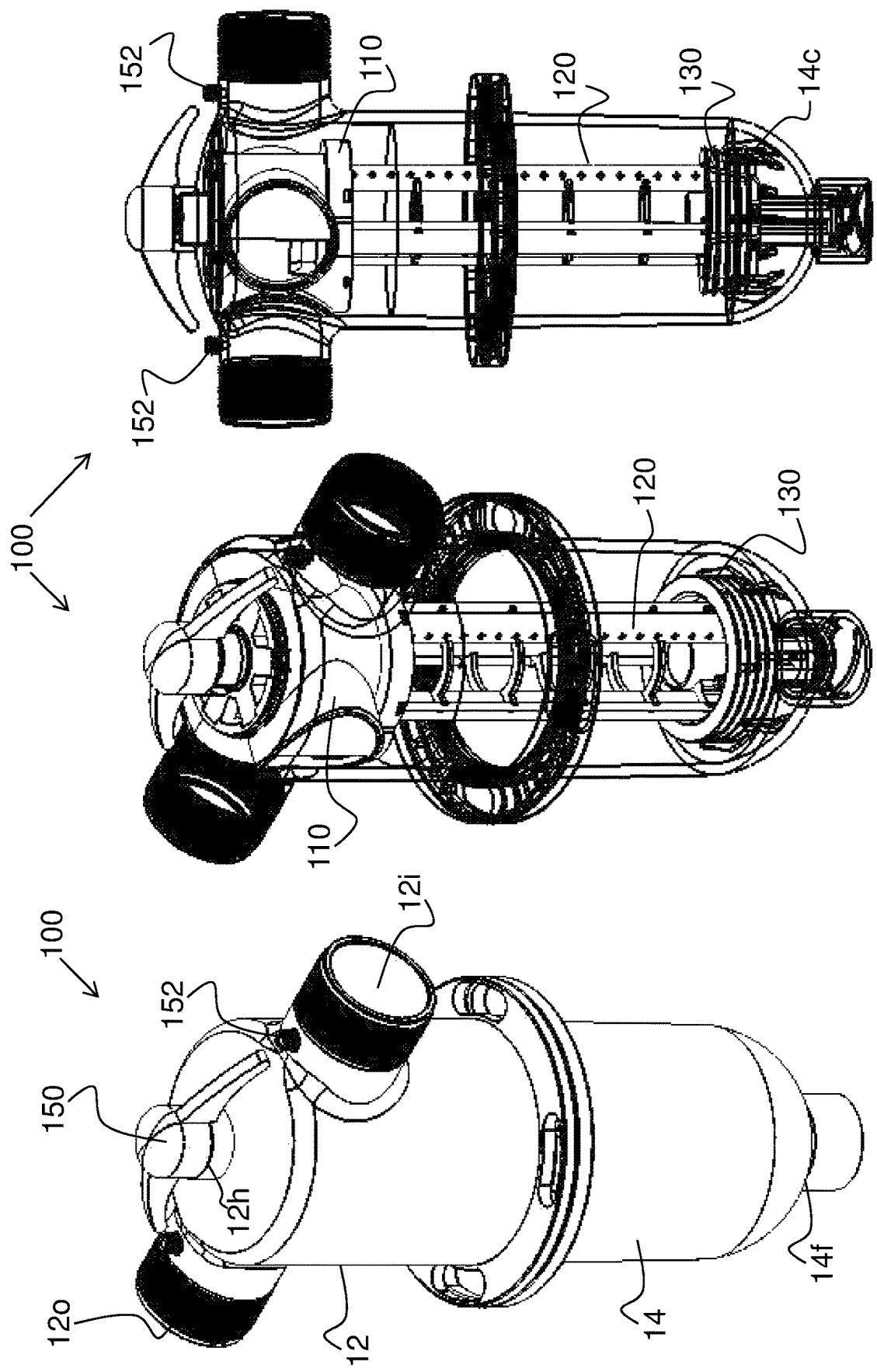

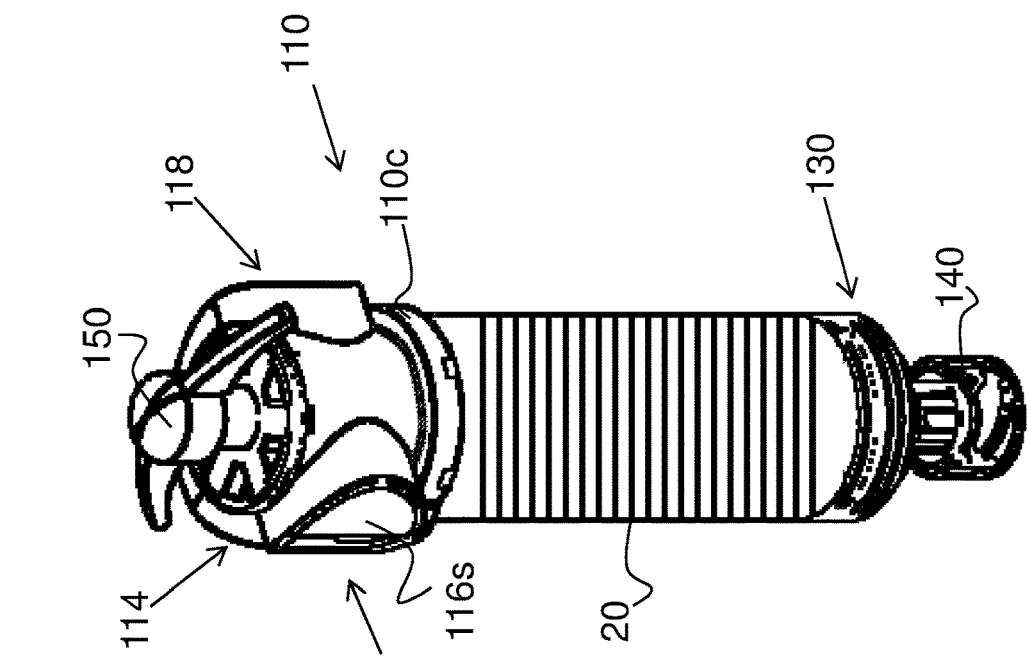
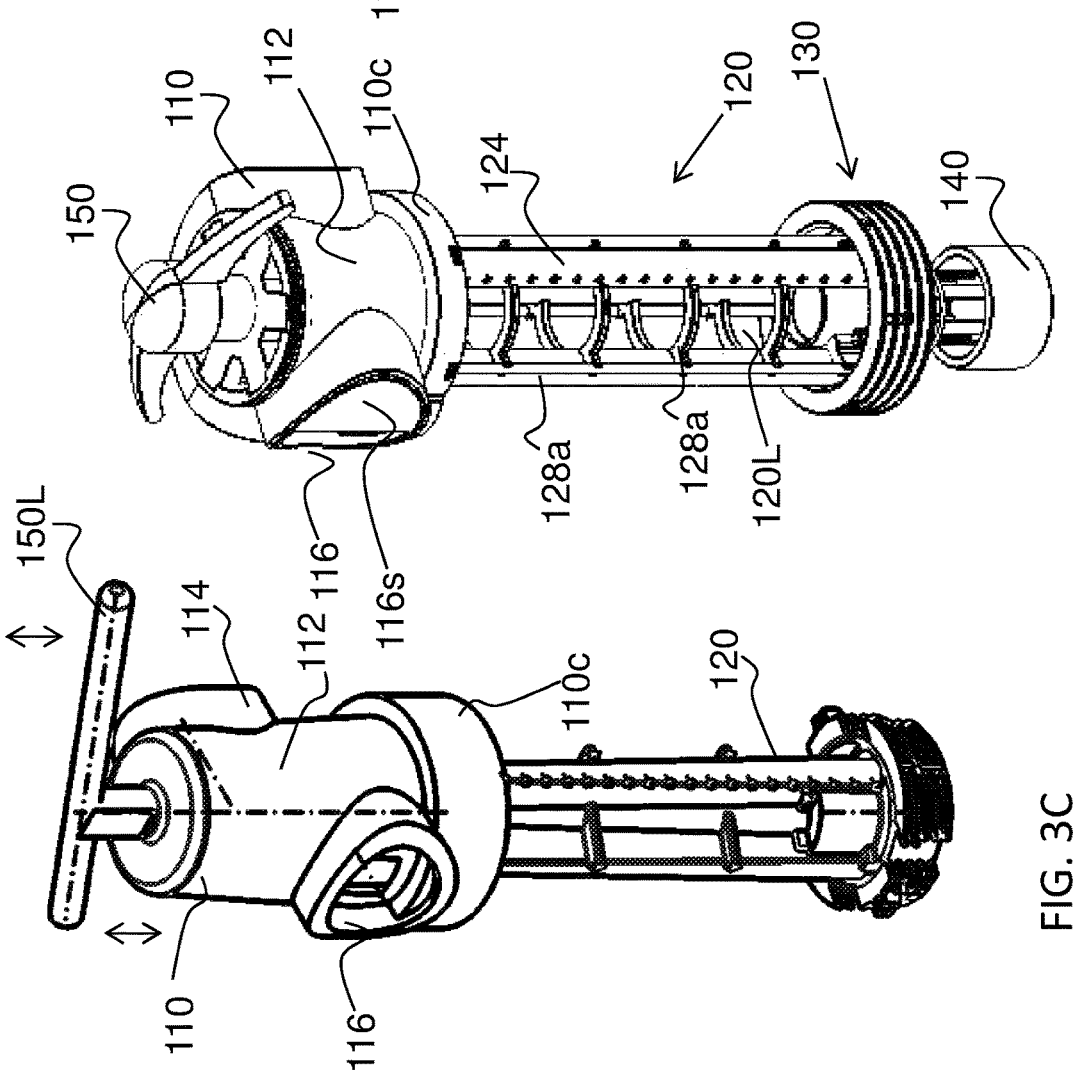

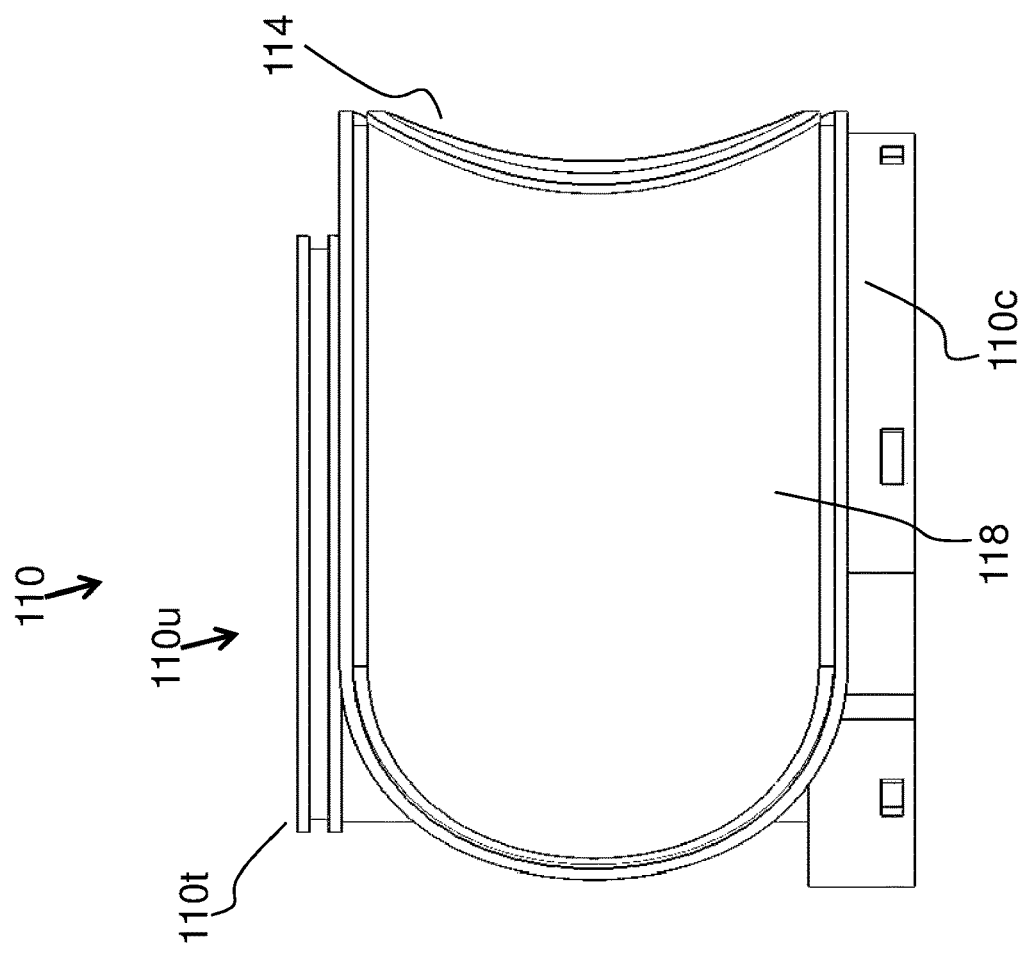
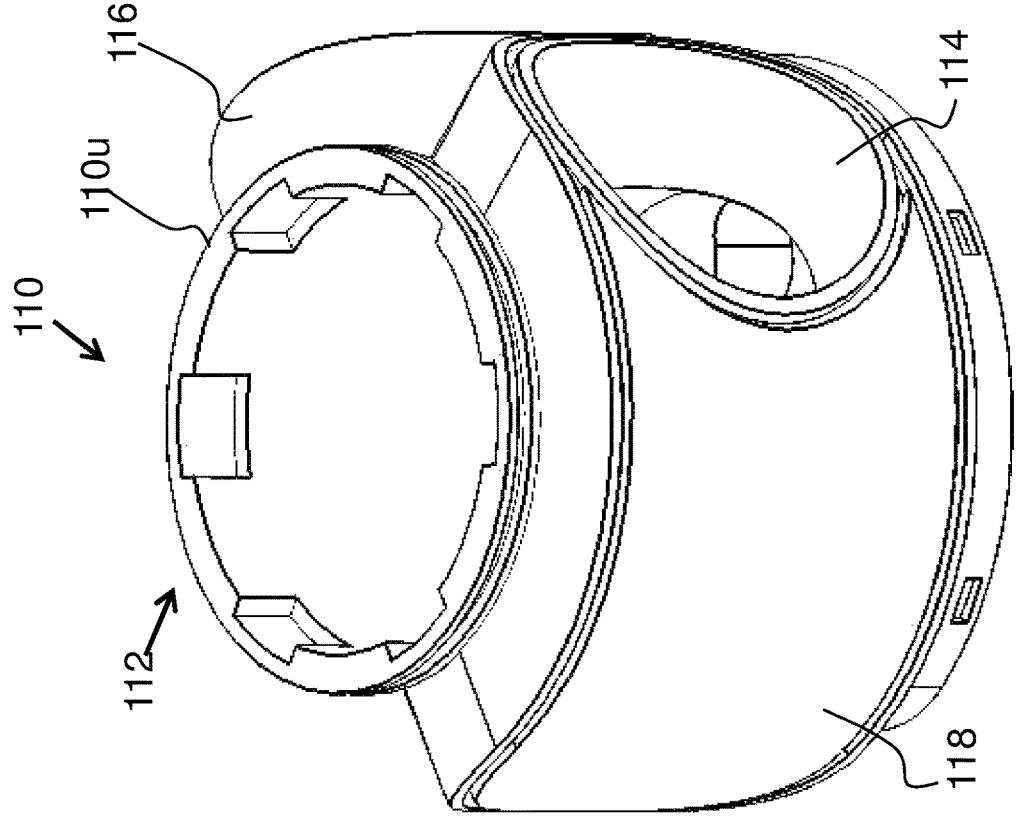
FIG. 6H
FIG. 6G

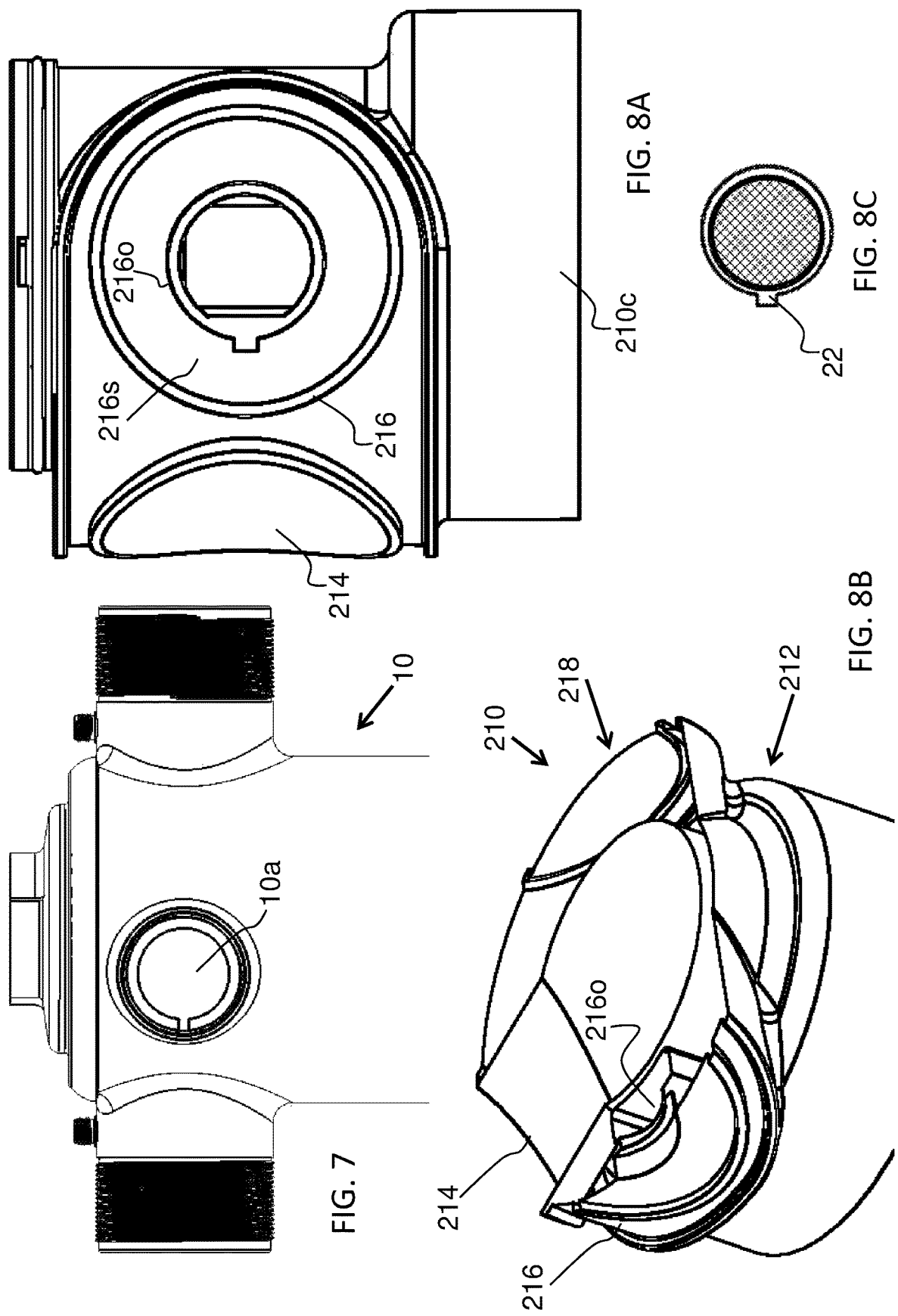

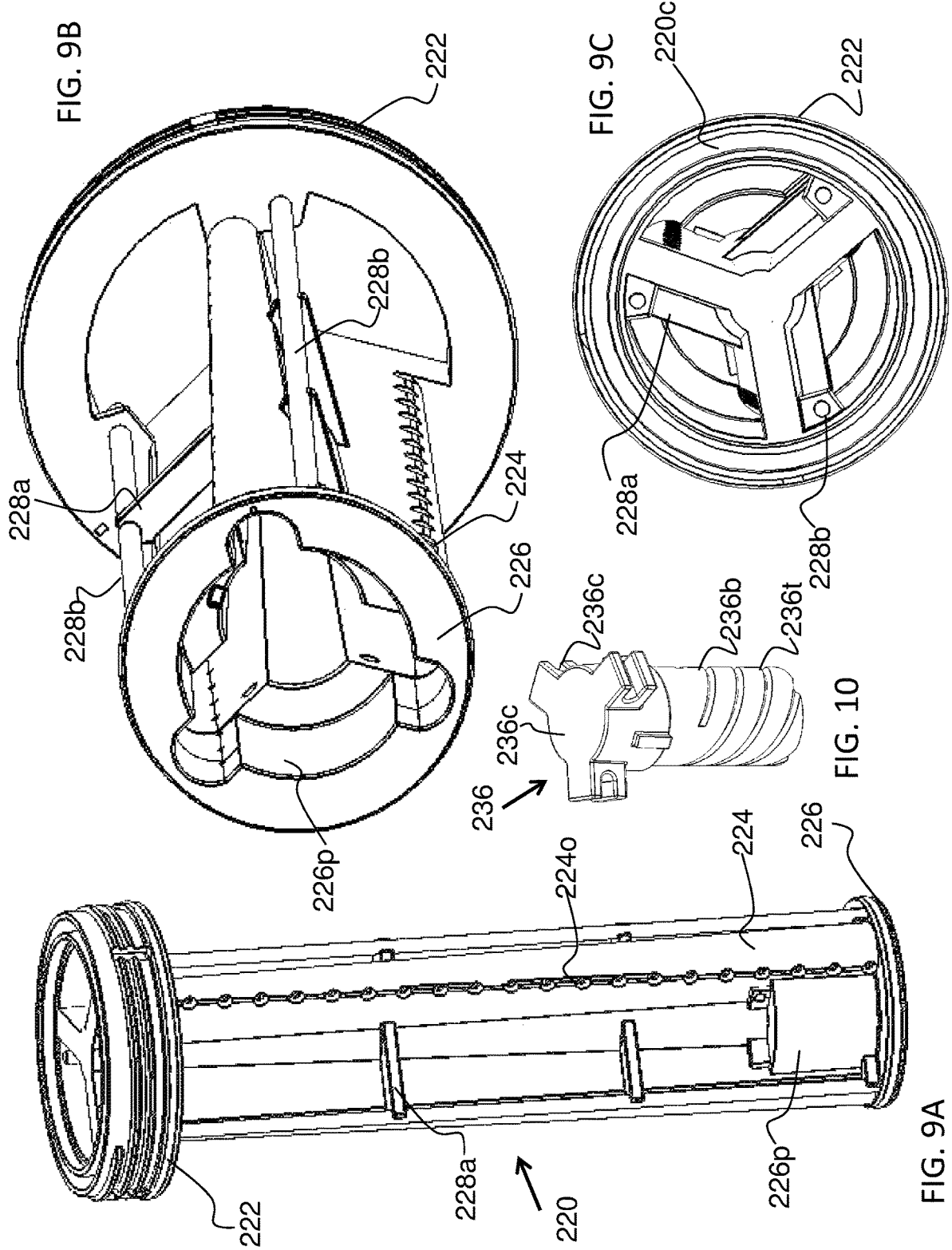

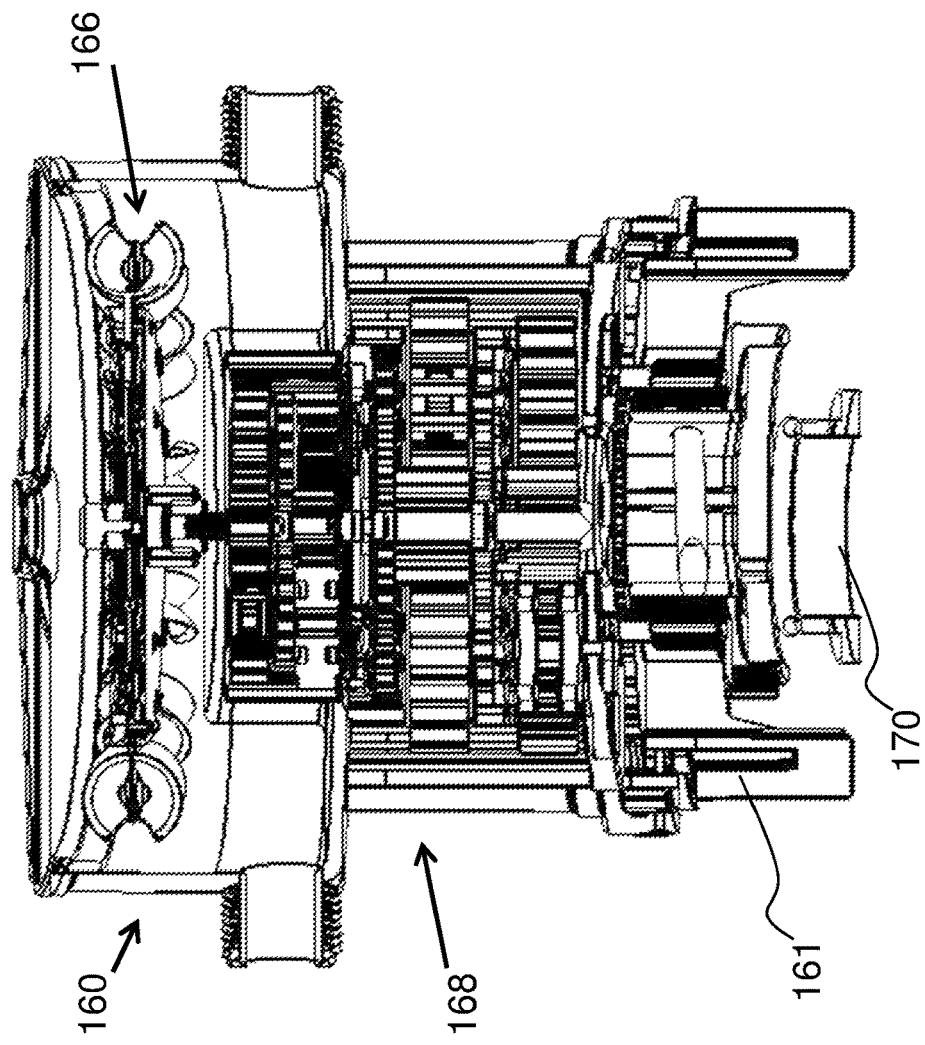
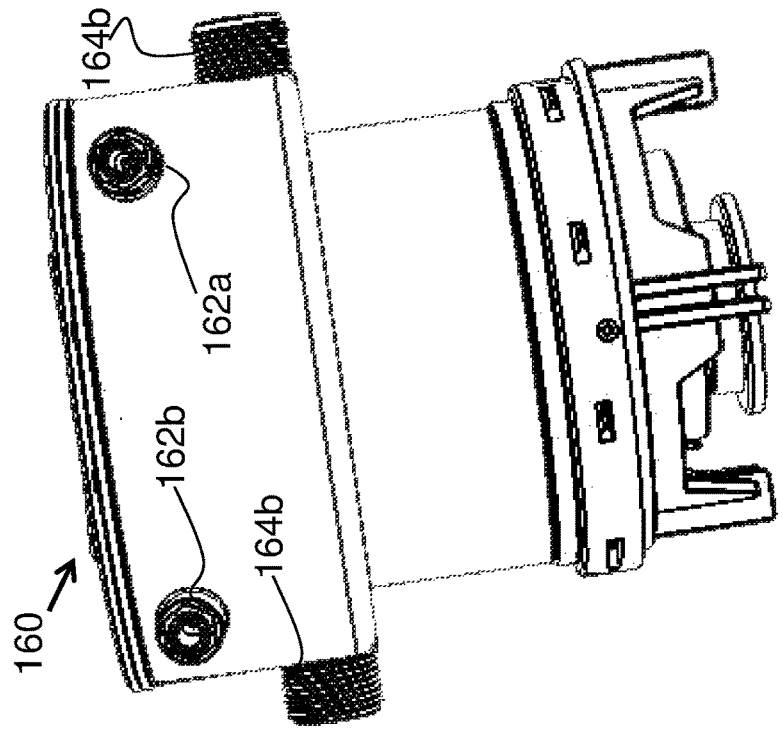
FIG. 13A
FIG. 13B

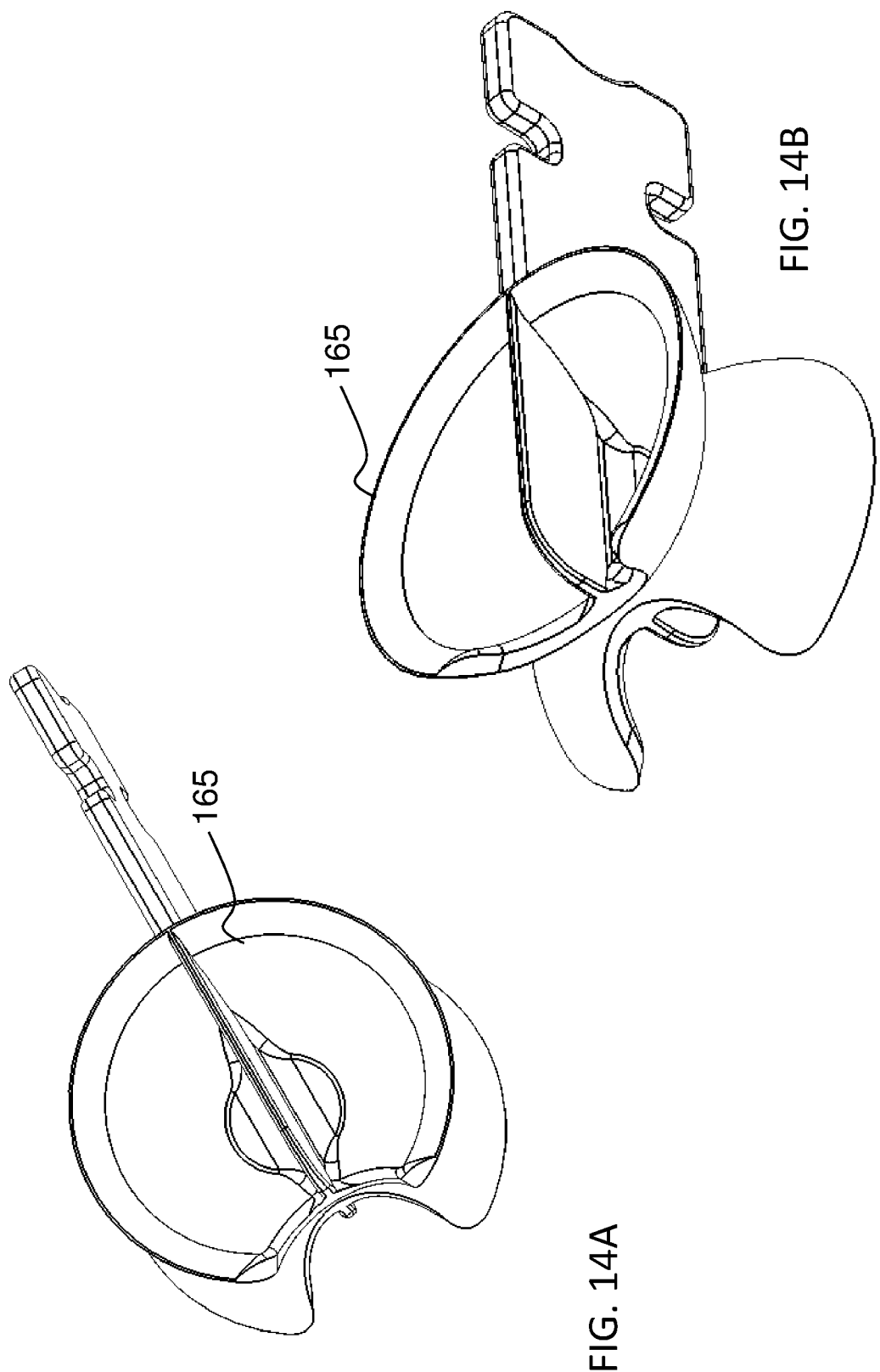

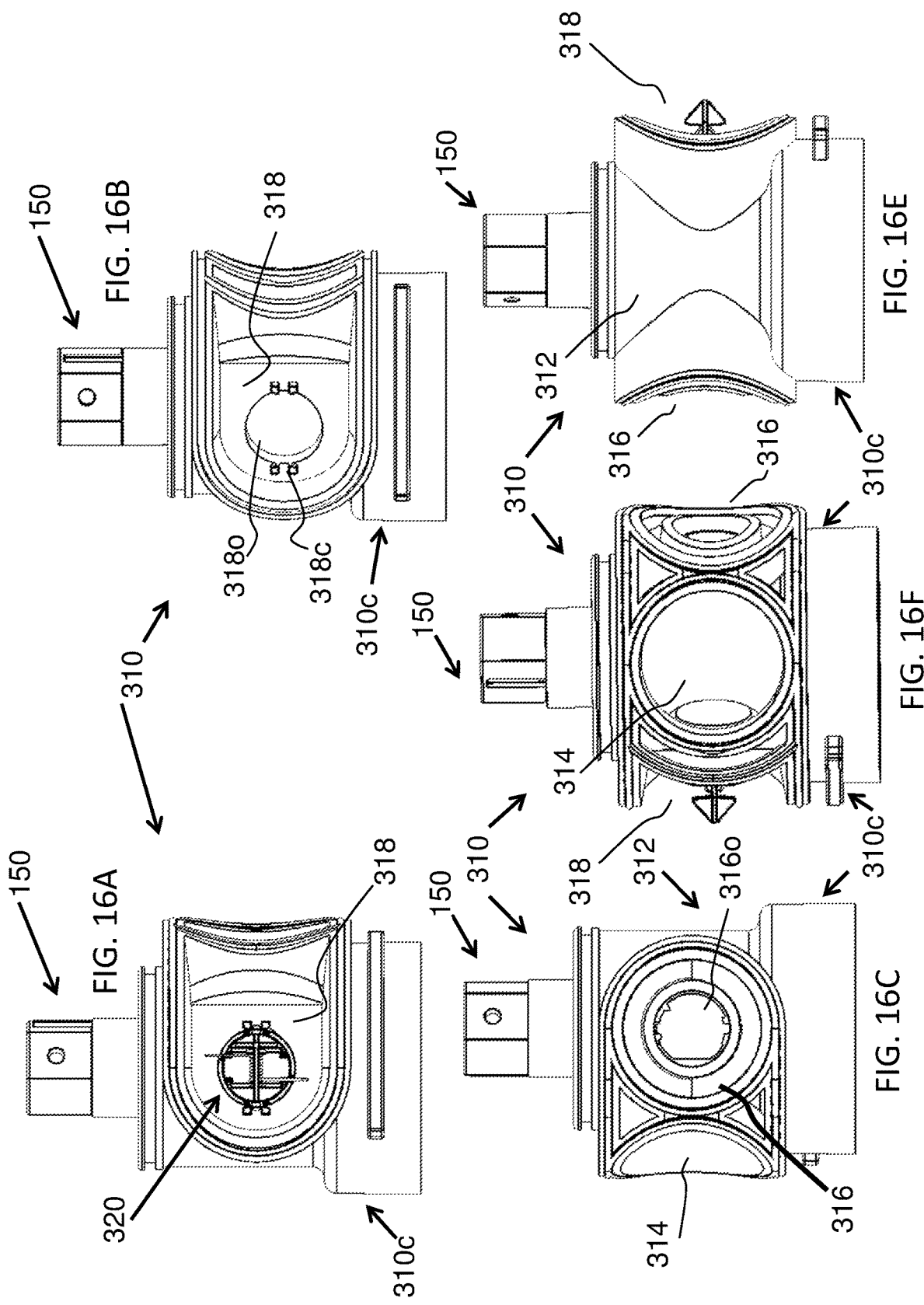

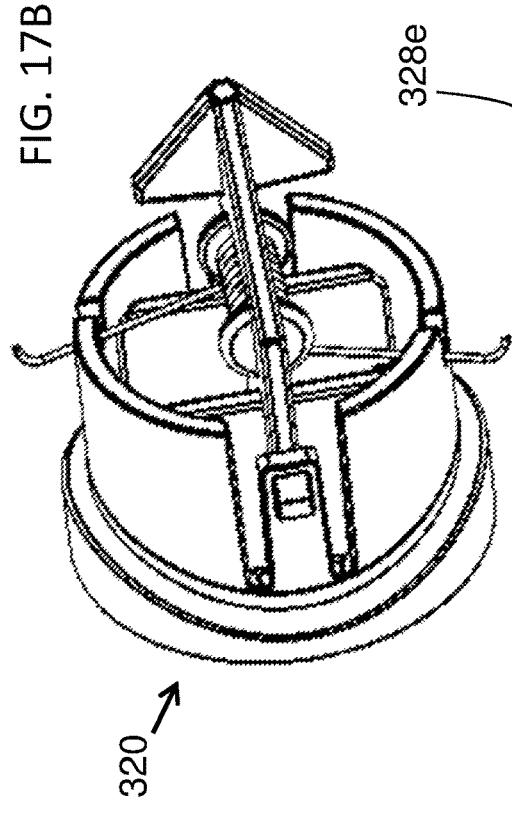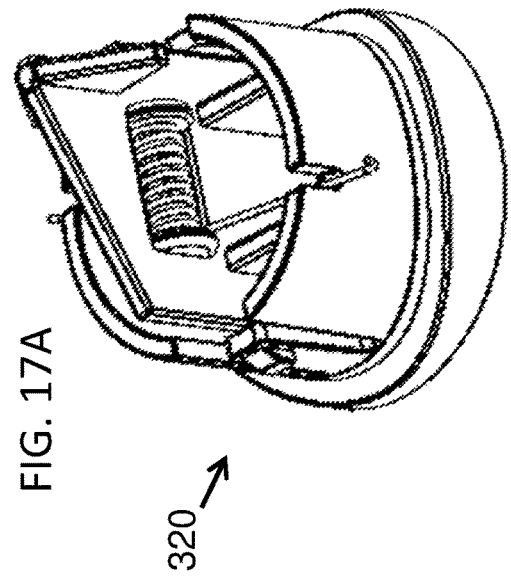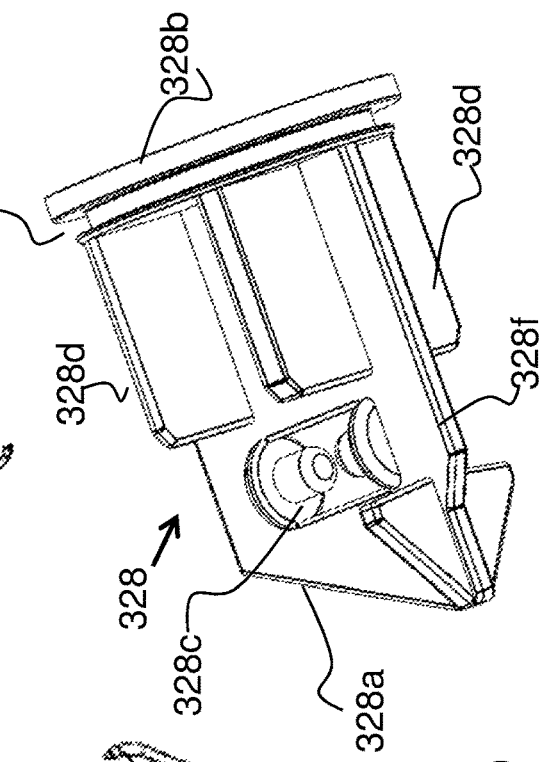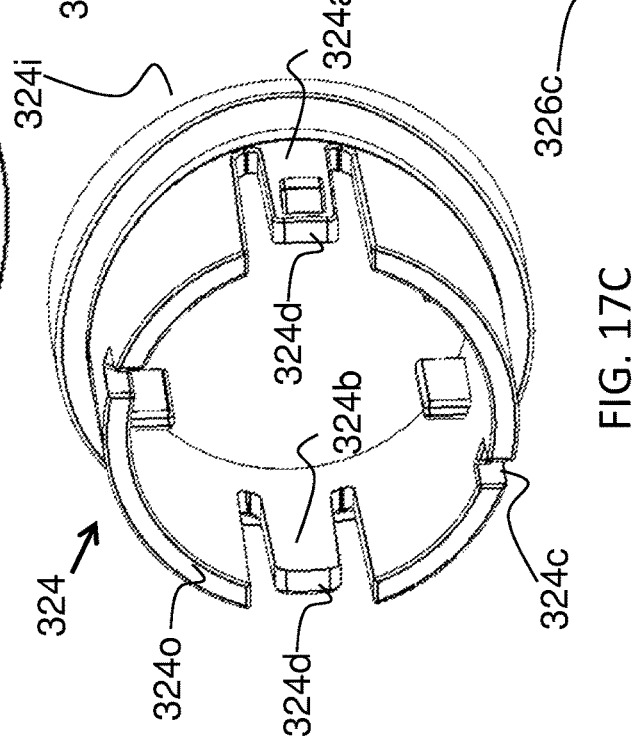

SELF CLEANING DISC FILTER APPARATUS

FIELD OF THE INVENTION

The present invention relates to a disc filter apparatus and in particular, to such a filtering apparatus having self-cleaning capabilities.

BACKGROUND OF THE INVENTION

Ring disc filter elements are a popular item used in agricultural irrigation and in industrial applications for filtering a flowing fluid primarily water. Agricultural use of disc filtering apparatus are generally utilized to prevent entry or filter out impurities, brought by the water flow to watering installations such as sprinklers, micro-spray and drip lines, that have evolved in water conscience environments and for water conscience irrigation.

Ring discs are highly efficient in their ability to filter particles from fluids. The ring discs are diagonally grooved on both sides to a specific micron size. A series of the ring discs are stacked and compressed on a spine. The compressed discs are placed within a housing to form an efficient filtering element, such that when stacked the grooves on top of each disc runs opposite from the grooves below it, creating a filtration system having a series of grooves and traps for solids particles suspended within the water.

When the ring disc filter stack is filled with debris as a result of the filtering process, it necessitates cleaning and maintenance procedures of the filtering disc elements. Self-cleaning filters or counter-current flow filter cleaning operations are known, and are believed to reduces the frequency of required disassembly of the filter and ring discs, improving the operation of the filter system and reduces labor costs, and saves on water during the disc cleaning operations.

However such self-cleaning disc filtering systems are limited to large scale agricultural systems that require a number of filters interconnected and networked with one another to form a specialized piping to control the flow during the filtering and self-cleaning phases. Such systems further utilize numerous external controllers and electronic valves to control the flow through the filter apparatus so as to allow for and automate the self-cleaning procedure. Furthermore such self-cleaning disc filter systems require neighboring filtering apparatus to provide the source of fluid utilized during the self-cleaning process.

U.S. Pat. Nos. 7,000,782 and 7,032,760 to Walton et al, teach an example of a manually controlled back washing filter apparatus that is limited to use with to a mesh filter.

SUMMARY OF THE INVENTION

The present invention overcomes the deficiencies of the background art by providing a standalone self-cleaning disc filter apparatus that utilizes a flow diverter internal to the filtering apparatus, such that the internal flow diverter provides for controlling the direction of flow through the disc filter apparatus so as to determine the apparatus mode and/or phase either the filtering phase or the self-cleaning phase.

Embodiments of the present invention may be realized in a manual or automated (motorized) form of self-cleaning filter apparatus therein further contributing to saving water in manual filtering apparatus.

In embodiment, the filter apparatus according to the present invention utilizes an internal flow diverter that provides for self-cleaned by diverting a flowing fluid source, so as to control the direction of flow through the filter body.

The direction of flow of the flowing fluid source for cleaning may be diverted through the internal flow diverter according to the present invention in any flow direction through the apparatus housing, for example including forward flowing and/or back-flush flowing (reverse flow).

Optionally the flowing fluid source for cleaning may for example include but is not limited to upstream unfiltered flowing fluid, upstream filtered flowing fluid, upstream in-line filtered flowing fluid, downstream filtered flowing fluid, an external contained—not in stream—fluid source, the like or any combination thereof.

Optionally cleaning the filtering element utilized with the apparatus and fluid diverter according to the present invention may be provided by a plurality of optional means for example including but not limited to fluid flushing, back-flushing, forward-flushing, fluid streaming, fluid jet streaming, brushing, suctioning, spinning, the like or any combination thereof.

In embodiments, the position of the flow diverter internal to the filtering apparatus may be controlled by a controller external to the filtering apparatus. In some embodiments the controller may be provided in the form of a handle. In some embodiments the flow through the bi-directional flow motor may be controlled with automated means such as a motor that is made functional with control module comprising a controller and valve assembly.

Optionally embodiments of the present invention may be realized in manual configuration or automated configuration, wherein said internal flow diverter is controlled manually, semi-automatically, automatically, hydraulically and/or electronically.

Embodiment of the present invention provide a disc filter apparatus having a filtering mode and a self-cleaning mode, the apparatus provided for filtering an un-filtered flowing fluid with a filtering element, optionally provided in the form of a plurality of stackable disc ring filters, utilizing a first flow direction; the apparatus configured to self-clean the filtering elements from filtered waste material and debris trapped thereon by utilizing a second flow direction, the apparatus encased within a housing configured to enable both first flow direction during filtering mode, and second flow direction during self-cleaning mode, the housing comprising:

a central spine assembly for holding the filtering elements both in a stacked configuration during filtration and an un-stacked configuration during self-cleaning; the spine assembly having a first end and a second end; the spine assembly associated at a first end with a piston assembly having a compressed configuration during filtration, and an de-compressed configuration during self-cleaning; wherein the piston assembly's closed (compressed) configuration provides for maintaining the filtering elements in a stacked formation along the length of the spine during filtration; and wherein the piston assembly's open (decompressed) configuration provides for un-stacking and/or opening the filtering elements and for the flushing of filtered waste materials to exit the housing during self-cleaning; wherein the piston assembly configuration may be actuated by the second flow direction;

the spine assembly associated at a second end with a fluid diverter in the form of a valve body characterized in that the fluid diverter is disposed internally within the housing and controlled externally to the housing; the fluid diverter having two states for actuating between filtering mode utilizing a first flow direction, and a self-cleaning mode utilizing a second flow direction.

Optionally the housing comprises at least three openings to allow the first flow direction during filtering mode, and the second flow direction during self-cleaning mode, the openings including a flush exit, an inlet opening, and an outlet, wherein the flow through the housing is controlled by the position of the fluid diverter.

Most preferably the first flow direction during filtering may be provided by flowing, under upstream fluid pressure, an un-filtered flowing fluid from the inlet opening into a peripheral lumen within housing and across the filter elements, that are optionally stacked, from the external diameter to its internal diameter, producing a filtered flowing fluid within an inner lumen defined by spine assembly. The filtered fluid flowing up through a first open aperture in the fluid diverter and out to the outlet opening.

Most preferably the second flow direction, during self-cleaning, is provided by flowing, under pressure, upstream un-filtered, upstream filtered or in-line filtered upstream, flowing fluid from the inlet opening through the fluid diverter via a second open aperture to a peripheral channel that is in fluid communication with a plurality of spine legs spanning the length of the central spine assembly. Preferably the spine legs comprise a plurality of exit orifices that direct and jet the upstream flowing fluid toward filtering element producing a cleaning effect that allows debris and filtered waste material to be flushed through the flush exit opening. Preferably the exit orifices that direct and jet the upstream flowing fluid further provide for cleaning the disc filtering elements directly and rotating the discs to create a centrifugal force that spins the discs to improve cleaning.

Optionally, the fluid diverter has a substantially cylindrical body including an upper face, a lower face and perimeter surface, the cylindrical body having a substantially open central lumen:

Optionally the diverter upper face may be adapted to be securely associated within the housing about an upper portion thereof; the upper surface may be provided to associate with a fluid diverter controller disposed external to the housing.

Optionally the diverter lower surface adapted to receive and be in fluid communication with the spine assembly about the spine assembly's second end.

Preferably the lower surface has a central opening that may be in fluid communication with the open central lumen. Preferably the central opening is surrounded by a peripheral channel disposed about the perimeter of the lower surface. Optionally and preferably the peripheral channel configured to received and securely couple with the spine assembly at the spine assembly's second end.

Most preferably the central opening is configured to be in fluid communication and continuous with a spine assembly inner lumen. Most preferably the peripheral channel is configured to be in fluid communication with a plurality of spine legs defining the spine assembly inner lumen.

Most preferably the diverter perimeter surface has a flow inlet portion defined along the surface, and at least three apertures extending from the perimeter surface including two open apertures and one closed aperture.

Optionally, the flow inlet portion may be configured to be opposite the housing's inlet opening so as to allow the flow of the upstream un-filtered or filtered or in-line filtered flowing fluid into the housing within the peripheral lumen, most preferably providing for the first flow direction during filtering. Optionally the first open aperture may be configured to align with and provide fluid communication between the outlet opening and the central opening defined about the diverter lower surface through the open central lumen, most preferably providing for the first flow direction during filtering.

Optionally the second open aperture may be configured to align with and provide fluid communication between the housing's inlet opening and the spine legs via the peripheral channel disposed along the diverter lower surface, therein providing for the second flow direction during self-cleaning.

Optionally the closed aperture may be configured to align with the outlet opening, the closed aperture provided to seal the outlet opening therein preventing loss of filtered downstream flowing fluid from flowing into the housing during the second flow direction during self-cleaning.

Optionally the fluid diverter's two open apertures are adjacent to one another.

Optionally the fluid diverter's two open apertures are about 90 degrees apart.

Optionally the fluid diverter's second open aperture and the closed aperture are about 180 degrees apart.

Optionally the fluid diverter's first open aperture and the closed aperture are about 90 degrees apart.

Optionally the size of the open apertures may be adjustable.

Optionally the second open aperture may be semi-blocked or partially opened.

Optionally the size of the second opening may be adjustable according to the pressure required to clean the filtering elements.

Optionally the size of the second opening may be adjustable according to measured flow across the filtering element.

Optionally the size of the second opening may be manually adjustable manually or automatically adjustable.

Optionally the flow inlet portion may be configured to span across about one half of the external surface of the diverter perimeter surface.

Optionally the flow inlet portion may be configured to span across about a 180 degrees arc of the diverter perimeter surface.

Optionally the flow inlet portion may be disposed substantially opposite the first open aperture.

Optionally, the flow inlet portion may be aligned with the inlet opening and the first open aperture may be aligned with the outlet opening during the first flow direction for filtering the un-filtered flowing fluid.

Optionally the fluid diverter's closed aperture may be aligned with the outlet opening and the second open aperture may be aligned with the inlet opening during the second flow direction during self-cleaning procedure.

Optionally the fluid diverter's upper surface may be securely fastened with the upper portion housing utilizing threading.

Optionally the housing may further comprise a fourth opening adapted to couple with to a fluid diverter handle to manually control the position of the fluid diverter within the housing.

Optionally the housing may comprise an upper portion housing and a lower portion housing that couple with one another.

Optionally the fluid diverter may be controlled manually with a handle.

Optionally the fluid diverter may be controlled electronically or hydraulically. In some embodiments control of the internal fluid diverter is provided with a bi-direction motor coupled with the internal fluid diverter.

Optionally the fluid diverter may be fit with an in-line filter mesh and/or screen to provide for in-line filtering of the upstream flowing during the self-cleaning mode.

Optionally the fluid diverter may be associated with the spine assembly at the spine second end, wherein the spine second end may be securely associated within a channel recess about the lower surface of the fluid diverter.

Optionally the spray nozzles orifices disposed along the length of the spine legs may be oriented inwardly of the filter elements for directing fluid outwardly across the filter elements to flush the filtering elements from its inner diameter edge toward the outer diameter edge.

Optionally the lower portion housing comprises a plurality of coupling members disposed along the internal surface of the lower portion housing, provided for supporting and holding the piston assembly within the lower portion housing.

Optionally the coupling members are elongated projections having a length proportional to the movement of a compression spring and compression plate disposed within the piston assembly.

Optionally the coupling members are provided in the form of a male coupling members and wherein the piston assembly comprises a corresponding female coupling member along the compression plate.

Optionally the apparatus filtering apparatus may further comprise at least one sensor in the form of a pressure sensor or flow sensor.

Optionally the apparatus filtering apparatus may further comprise a visual indicator indicative of time to switch from the filtering mode to the self-cleaning mode.

Optionally the flush exit may be controlled with a dedicated flush valve. Optionally flush valve may be is internal the filter apparatus housing to and/or incorporated within the filter apparatus housing. Optionally flush valve may be controlled by the position of the fluid diverter. Optionally the flush valve and fluid diverted may be controlled concertedly.

Optionally flush valve may be external to filter apparatus housing and controlled externally by means for example including but not limited to manually, remotely, electronically, hydraulically, automatically, flow sensors, pressure sensors, the like or any combination thereof.

Optionally the flush valve and fluid diverted may be controlled concertedly by the same external means.

Optionally the filtering apparatus according to embodiments of the present invention may be used as a stand-alone filtering device. Optionally the filtering apparatus according to embodiments of the present invention may be used in a filtering network comprising a plurality of filtering apparatus that are interconnected with one another and/or networked together to form a battery of filters.

In embodiments, the present invention provides a disc filter apparatus for filtering a flowing fluid, comprising: a housing having an open lumen and comprising an upper portion and a lower portion securely coupled with one another; wherein the housing having at least three openings to allow the flowing fluid to controllably flow through the housing providing at least two directions of flow, a first direction of flow for filtering and a second direction of flow for self-cleaning; the three openings including an inlet opening, outlet opening and a flush exit opening; and wherein the at least two direction of flow are controllable with a flow diverter disposed within the upper portion housing;

wherein within the open lumen, the housing includes a plurality of disc filter elements that are centrally stacked and held on a spine, wherein the spine and stacked filter elements defines two concentric lumen within the housing open lumen including an outer peripheral lumen defined between the internal surface of the housing and the external edge of the stacked filter elements; and an internal lumen defined by the inner surface of the spine and the stacked filter elements; wherein the peripheral lumen may be provided for receiving unfiltered upstream flowing fluid and the internal lumen may be provided for receiving filtered flowing fluid; such that during the first direction of flow, the flowing fluid flows across the stack of filter elements from the peripheral lumen toward the internal lumen; the spine assembly having a plurality of spine legs internally of the stack of the disc filter elements, wherein the plurality of spine legs are provided in the form of a hollow elongated tube having a plurality of spray nozzle orifices along its length, and wherein the spine legs span along the length of the spine between a spine second end and a spine first end; wherein the spine first end may be associated within the housing lower portion and the spine second end may be associated within the housing upper portion;

the spine assembly first end may be associated with a piston assembly that may be disposed within the lower portion housing; the piston assembly comprising a compression spring and compression plate that may be fluidly associated with the base end of the spine assembly, the compression spring having sufficient tension to compress the compression plate and against the stacked filter elements along the length of the spine assembly, from the spine first end toward the spine second end, therein maintaining the stacked filter element configuration during the first direction of flow;

the piston assembly configured for releasing the stacked filter elements along the length of the spine assembly during the second direction of flow; wherein, in response to a flowing fluid pressure produced within the spine legs, retracting the compression plate against the compression spring to counter the tension to release and relieve pressure on the stacked filter elements; therein opening the spaces between the filter elements to facilitate cleaning the filter elements during the second direction of flow, allowing for the flushing of filtered waste materials to exit the housing;

wherein the fluid diverter directs fluid flow through the housing lumen across the at least three openings in producing the first direction of flow for filtering and the second direction of flow for self-cleaning; the fluid diverter characterized in that the fluid diverter may be disposed internally within the upper portion housing provided in the form of valve body in fluid communication with, and controlling the flow through, the inlet opening, the outlet opening, and the flush exit opening via the spine legs at the spine second end;

wherein the fluid diverter may be controlled externally to the housing; the diverter having a substantially cylindrical body including an upper face, a lower face and perimeter surface, the cylindrical body having a substantially open lumen; the diverter upper face may be adapted to securely associated with the upper portion housing; provided to associate with a fluid diverter controller disposed external to the housing;

the diverter lower surface adapted to receive and securely fit with the spine second end portion; the lower surface having a central opening that may be surrounded by a peripheral channel disposed about the perimeter of the lower surface; the channel configured to received and securely couple with the spine second end portion wherein the central opening may be configured to be in fluid communication with the internal lumen defined by the spine; and wherein the peripheral channel may be configured to be in fluid communication with the plurality of spine legs; the diverter perimeter surface having at least two open apertures extending from the perimeter surface; a first open aperture configured to align with and provide fluid communication between the outlet opening and the central opening defined about the diverter lower surface; therein providing a portion of the first flow path allowing filtered clean-fluid to flow from the internal lumen to the outlet opening; a second open aperture configured to align with and provide fluid communication between the inlet opening and the spine legs via the peripheral channel disposed along the diverter lower surface, therein providing the second flow path for second flow direction self-cleaning where second flow direction may be utilized to clean the stacked filter elements; wherein un-filtered upstream flowing fluid from the inlet opening flows through the second open aperture toward the peripheral channel and onto the spine legs;

the diverter perimeter face having at least one closed aperture extending from the perimeter surface, configured to align with the outlet opening, the closed aperture provided to seal the outlet opening therein prevent loss of filtered downstream flowing fluid from flowing into the housing during the second flow path therein allowing for second flow direction self-cleaning where second flow direction may be utilized to clean the stacked filter elements; and the diverter perimeter surface having a flow inlet portion defined along its external surface configured to be opposite the inlet opening so as to allow free flow of the un-filtered flowing fluid into the housing during the first direction of flow, wherein the un-filtered flowing fluid flows into the peripheral lumen to be filtered across the stacked filter elements.

Within the context of this application the term flowing fluid refers to any flowing fluid in the form of a liquid, gas, plasma or the like that may be filtered from waste or impurities. Although reference to a flowing fluid made within the context of this application generally refers to water in filtered or unfiltered forms utilized in irrigation and/or an agricultural setting, however, the present invention for a filtering apparatus is not limited to such agricultural and/or irrigation uses and maybe used in any application or environment where filtering a flowing fluid is required, for example including but not limited to home use, drinking water applications, water treatment, sewage treatment, effluent, industrial use, pool filters, or the like.

Within the context of this application the term upstream refers to an un-filtered source or location of a flowing fluid before filtration and use with of the apparatus subject of the present invention.

Within the context of this application the term downstream generally refers to a filtered source or location of a flowing fluid after filtration and use of the apparatus subject of the present invention.

Within the context of this application the term "orifice" may refer to any opening and/or pore configured to introduce a flowing fluid under pressure to produce a spray, stream or jetting effect, the shape of the of orifice may assume any profile such as circular, ovular, rectangular, slit, square, polygonal or the like.

Within the context of this application the term ring disc filters or disc filters may be used interchangeably to refer to an annular filtering element capable of filtering water or other such flowing fluids as its passes across them. The filtering occurs when water passes through slots in the discs or between them. The discs configuration and/or shape and/or its slits may be of any shape and may for example be rounded, rectangular triangular or in any other shape.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2A-D are schematic illustration of an exemplary self-cleaning apparatus according to optional embodiments of the present invention;

FIG. 3A-C are schematic illustration of the core filtering components of the self-cleaning apparatus according to optional embodiments of the present invention;

FIG. 6A-H are schematic illustration and optional views of the internal flow diverter valve body of self-cleaning apparatus according to optional embodiments of the present invention;

FIG. 7 is a schematic illustration of an optional housing of an exemplary self-cleaning apparatus according to optional embodiments of the present invention;

FIG. 8A-C are schematic illustration and optional views of the internal flow diverter valve body of self-cleaning apparatus according to optional embodiments of the present invention;

FIG. 9A-C are schematic illustration and optional views of an optional core filtering components including an optional spine assembly of the self-cleaning apparatus according to optional embodiments of the present invention;

FIG. 10 is a schematic illustration of an optional compression adaptor forming a part of the piston assembly of the self-cleaning apparatus according to optional embodiments of the present invention;

FIG. 13A-B are various view of a schematic illustration of an exemplary bi-directional flow motor utilized to control the internal fluid diverter a according to embodiments of the present invention;

FIG. 14A-B are various view of a schematic illustration of the bi-directional turbine vanes of the bi-directional flow motor according to embodiments of the present invention;

FIG. 16A-E show schematic illustrations of an internal fluid diverter featuring a pressure stabilizing assembly according to embodiments of the present invention; and FIG. 17A-E show schematic illustration of a pressure stabilizing assembly according to embodiments of the present invention.

DESCRIPTION OF THE PREFERRED EMBODIMENTS

Figure 1A:
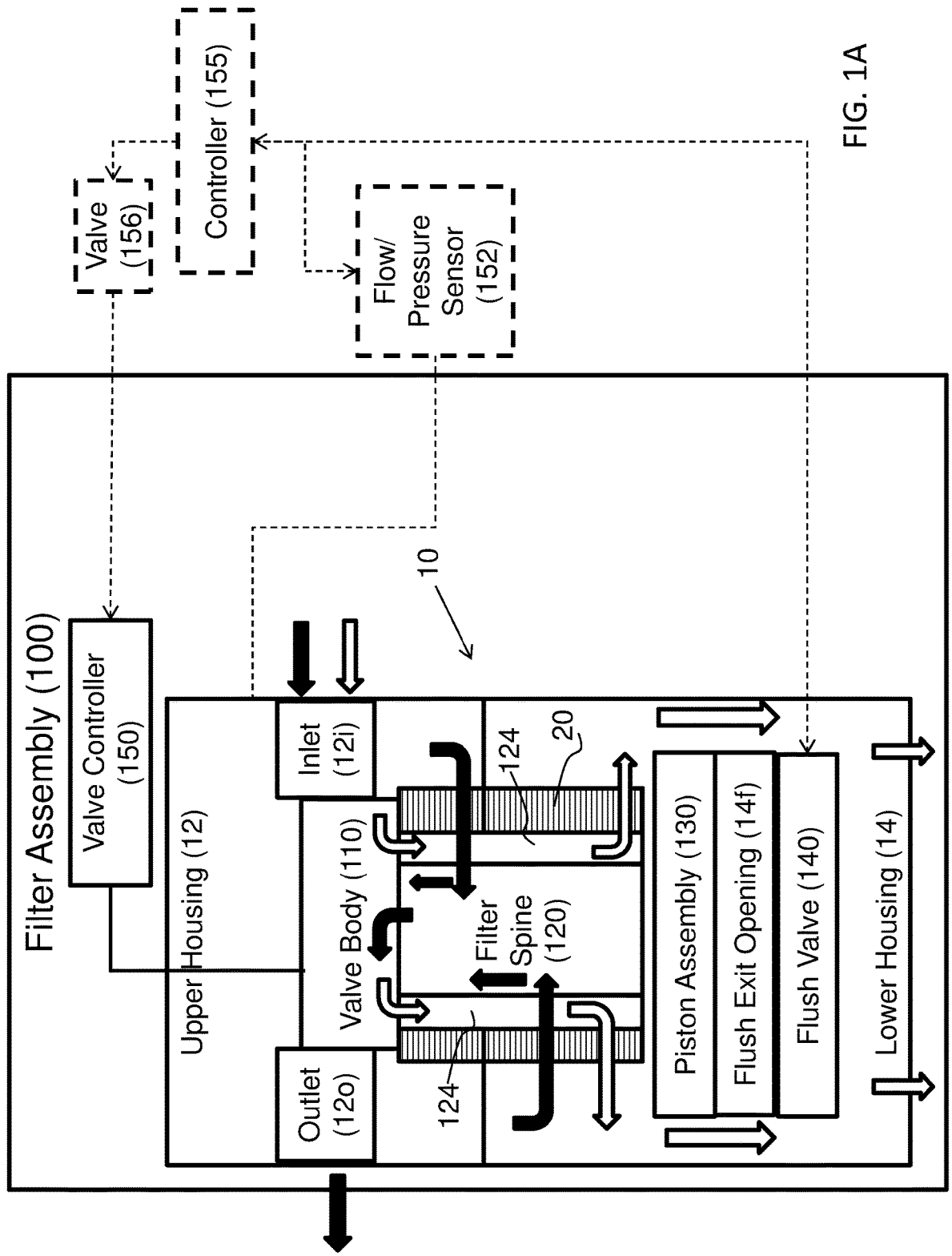
FIG. 1A is a schematic block diagram of an exemplary self-cleaning filtering apparatus according to optional embodiments of the present invention.

The principles and operation of the present invention may be better understood with reference to the drawings and the accompanying description. The following figure reference labels are used throughout the description to refer to similarly functioning components are used throughout the specification hereinbelow.

| | | | |
|---|---|---|---|
| 10 | Filter Housing; | 12o | downstream outlet opening; |
| 10a | dedicated opening; | 14 | Lower housing; |
| 10L | peripheral lumen/; | 14c | piston assembly coupling members; |
| 12 | Upper Housing; | | |
| 12h | handle opening; | 14f | flush exit opening; |
| 12i | upstream Inlet opening; | 20 | stacked disc filter elements; |
| 22 | in-line mesh filter ring | 124o, | spray orifice |
| 100, | filter apparatus; | 224o | |
| 102 | | 126, | spine first end/spine base portion; |
| 110, | fluid diverter/valve | 226 | |
| 210, | body; | 226 | adaptor housing; |
| 310 | | 128a, | spine radial support members |
| 110L | valve body open lumen; | 228a | |
| 110u | valve body upper face; | 128b, | spine longitudinal support members |
| 110b | valve body lower face; | 228b | |
| 110o | valve body lower central opening; | 130, 230 | Piston assembly; |
| | | 132, 232 | compression plate; |
| 110c | peripheral channel; | 232a | compression plated adaptor housing; |
| 110p | valve body perimeter surface; | 232t | threading; |
| 110t | upper face threading; | 134, | compression spring; |
| 112, | flow inlet portion/ | 234 | |
| 212 | inlet aperture; | 236 | piston compression adaptor; |
| 114, | first open aperture/ | | |
| 214 | outlet open aperture; | 236a | head portion |
| 116, | second open aperture/ | 236b | tail portion; |
| 216 | spine aperture; | 140 | flush valve; |
| 116s, | spine aperture sealed | 150 | valve controller/regulator/switch; |
| 216s | portion; | | |
| 116o, | spine aperture open | 152 | flow/pressure sensor; |
| 216o | portion; | 155 | automated controller; |
| 118, | closed aperture/ | 156 | flow valves; |
| 218 | outlet close aperture; | 160 | flow motor; |
| 120, | filter spine assembly; | 161 | housing; |
| 220 | | 162, | motor inlet; |
| 120c, | spine connecting | 162a, | |
| 220c | channel; | 162b | |
| 120L | spine lumen/ | 164, | motor outlet; |
| | inner lumen/ | 164a, | |
| | internal lumen central; | 164b | |
| 122, | spine second | 166 | flow turbine module; |
| 222 | end/spine top portion; | 165 | turbine vanes; |
| 122c | spine leg connectors; | 168 | gear and clutch module; |
| 124, | spine legs; | 170 | fluid diverter coupling adaptor; |
| 224 | | | |
| 312 | flow inlet portion/inlet aperture; | 310 | pressure relief fluid diverter; |
| 314 | first open aperture/outlet | 310c | peripheral channel; |
| | open aperture; | 324c | spring recess; |
| | | 324d | holding pegs; |
| 316 | second open aperture/ | 324i | housing (inner) distal end; |
| | spine aperture; | 324o | housing (outer) proximal; |
| 316o | spine aperture open portion; | | end |
| | | 326 | spring; |
| 318 | pressure relief aperture; | 326a | spring body; |
| | | 326c | spring end; |
| 318c | coupling member; | 328 | piston body; |
| 318o | pressure relief opening; | 328a | outer end surface; |
| 320 | pressure relief piston assembly; | 328b | inner end surface; |
| | | 328c | spring housing recess; |
| 324 | housing; | 328d | housing coupling fins; |
| 324a | outer surface; | 328f | central body; |
| 324b | inner surface; | 328e | seal recess; |

Figure 1B:
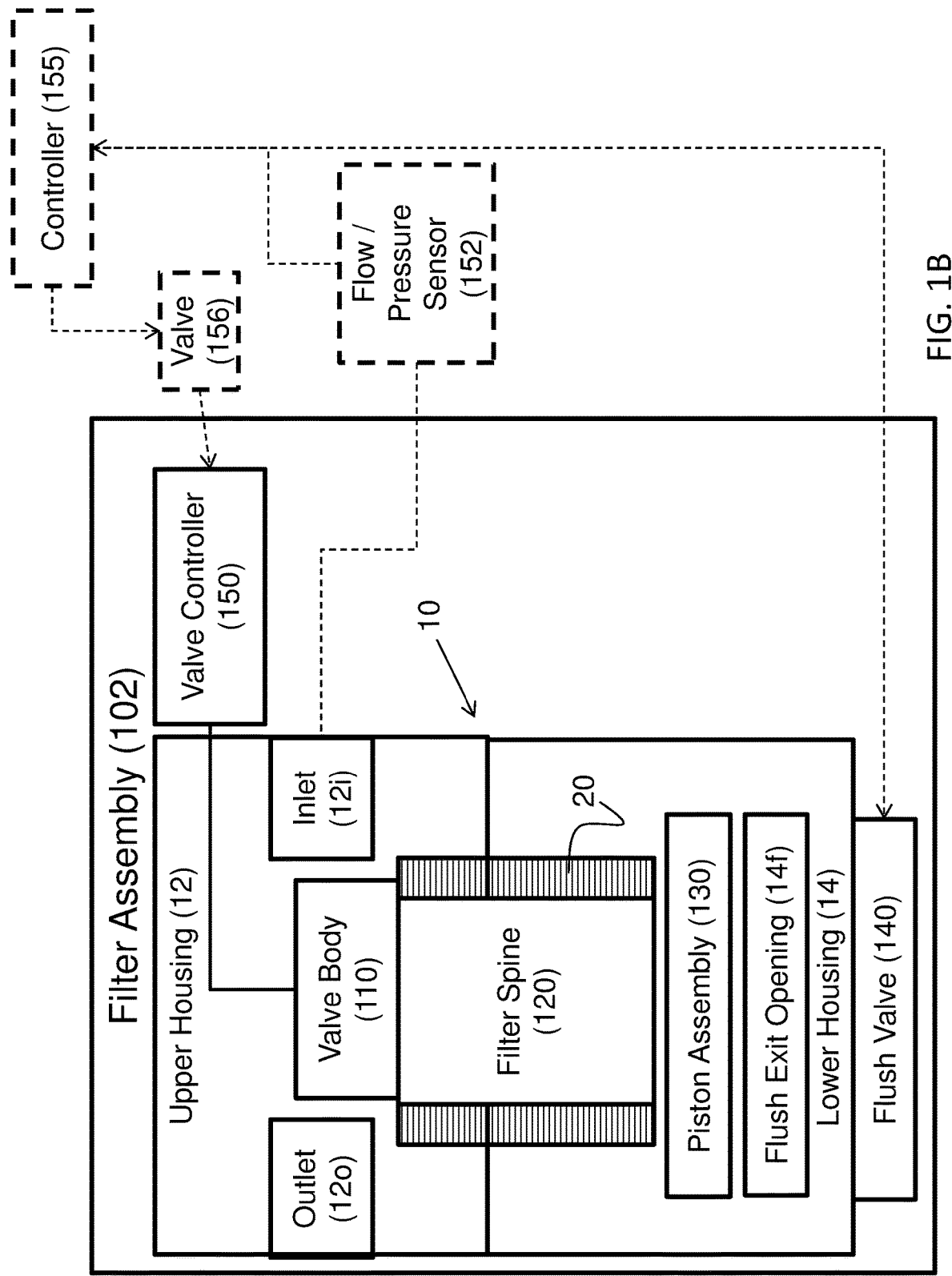
FIG. 1B is a schematic block diagram of an optional configuration of the filtering apparatus according to optional embodiments of the present invention.

Referring now to the drawings, FIGS. 1A-B show schematic block diagrams of optional configuration of a self-cleaning filter apparatus 100 according to embodiments of the present invention. FIG. 1A shows apparatus 100 where a flush valve 140 is incorporated within housing 10 such that the flush valve 140 may be controlled internally with apparatus 100.

FIG. 1B shows an optional configuration of apparatus 100 depicted in FIG. 1A in the form of apparatus 102 wherein that flush valve 140 is external to housing 10 and may be controlled externally, manually, remotely, electronically, hydraulically and/or automatically.

Filter apparatus 100,102 are configured to receive an upstream flowing fluid within a housing 10 that is equipped with filtering element(s) 20, for filtering the flowing fluid as it flows across filtering element(s) 20. Filter apparatus 100 is adapted to function in at least two modes a filtering mode and a self-cleaning mode.

Optionally the filtering apparatus 100,102 may be used as a stand-alone filtering device. Optionally filtering apparatus 100,102 may also be used in a filtering network and/or battery comprising a plurality of filtering apparatus 100,102 that are interconnected with one another and/or networked together to form a battery of filters.

The filtering mode utilizes a first direction of flow through apparatus 100, shown by the black arrows, and the self-cleaning mode utilizes a second direction of flow through apparatus 100 to clean filtering element(s) 20 from accumulated debris, shown by the white arrows.

Filter apparatus 100 comprises a housing 10 having an open lumen that includes filtering elements 20 disposed on a spine assembly 120, filtering element 20 is provided in the form of a plurality of ring disc filters that are disposed along the length of spine assembly 120, in a compressed stacked formation. Embodiments of the present invention provide for stacking (compress) and de-stacking (decompressing) the plurality of ring disc filters 20 along the length of spine assembly 120.

The filtering elements 20 and spine assembly 120 are preferably centered within the lumen of housing 10, and configured to maximize the filtering volume available within the internal cavity of housing 10. Optionally and preferably spine assembly and filtering elements 20 compartmentalize housing 10 into two concentric lumen, an external lumen 10L and an internal lumen 120L. Most preferably external lumen 10L provides for receiving the un-filtered flowing fluid while internal lumen 120L provides for receiving the filtered flowing fluid.

Housing 10 comprises two portions, an upper housing portion 12 and a lower housing portion 14 that may be coupled and securely sealed with one another to form housing 10. Housing upper housing portions 12 and lower housing portions 14 may be coupled with one another by optional coupling means as is known in the art for example including over an external clamping ring, matching threading, nuts and bolts, snaps, male-female connection members, any combination thereof or the like.

Spine assembly 120 and filtering elements 20 may span both upper housing portion 12 and lower housing portion 14. Preferably the length of spine assembly 120 is maximized to fit within the internal cavity formed within housing 10.

Housing 10 comprises at least three openings provided to allow both first flow direction during filtering, and the second flow direction, during self-cleaning. Optionally the at least three openings may be dispersed on housing 10 in any combination or manner on upper portion housing 12 and lower portion housing 14. Preferably the at least three openings include an inlet opening 12i, an outlet opening 12o and a flush exit opening 14f.

Optionally housing 10 may be fit with a fourth opening for associating a valve controller 150 with housing 10, optionally and preferably about upper housing portion 12. Most preferably valve controller 150 is disposed externally to housing 10 and provided to control the position of a fluid diverter 110 disposed internally to housing 10.

In embodiments valve controller 150 may be provided in the form of a bidirectional flow motor 160, shown in FIG. 12-14. Bidirectional flow motor 160 utilizes directed upstream water flow to control the position of the internal fluid diverter 110 that in turn control the phase of filter 100.

Optionally valve controller 150 may be controlled with a rotational motions providing for manually turning controller 150 to change between the different position of diverter 110, therein changing between the direction of fluid flow.

Optionally valve controller 150 may be controlled with a linear manual manipulation wherein controller 150 is provided in the form of a lever that may be raised up and down so as to switch the direction of fluid flow through housing 10 and preferably through diverter 110, for example s shown in FIG. 3C.

An example of a valve controller 150 in the form of a manual lever 150L is shown in FIG. 3C. Optionally linearly manipulating lever 150L, to cause fluid diverter 110 to move up and down, allows the diversion of the flowing fluid through diverter 110 to flow from the inlet aperture (112 not shown) to aperture 116 (spine aperture) so as to divert flow into channel 110c while simultaneously releasing and/or unstacking the disc filtering elements (not shown in this view) disposed along the spine 120. Preferably the reverse motion of lever 150L allows for stacking the disc filtering elements 20 along spine 120 while allowing upstream flowing fluid to be diverted via diverter 110 into housing 10 for filtering across the stacked disc filters.

Accordingly FIG. 3C shows an optional depiction of a controller 150 in the form of a lever 150L that may be utilized to simultaneously control the flow of upstream flowing fluid through diverter 110 and to stack (compress) or unstack (release) the disc filters along spine 120. Optionally lever 150L may further simultaneously provide for opening or closing flush opening 14f during self-cleaning or filtering modes respectively.

Optionally valve controller 150 may be controlled by automatic means for example by way of a mechanical valve, electronic valve, hydraulic valve or the like.

Optionally housing 10 may be provided with optional dedicated openings, for example for associating housing 10 with an external fluid source, for introducing an external fluid source into housing 10. Optionally such an external fluid source may be a container comprising at least one or more of an agent, a flowing fluid, an additive, a cleaning agent, a filtering additive, a cleaning fluid, a detergent, the like or any combination thereof.

Optionally housing 10 may be provided with a further optional dedicated opening for example openings 10a, 12h. Optionally opening 10a may be placed about upper portion 12 or lower portion 14.

Optional dedicated opening 10a, for example as shown in FIG. 7, preferably provides placement and replacement of an integrated in-line circular mesh filter ring 22. Circular mesh filter ring 22 may optionally be associated over aperture 116 on fluid diverter 110 to provide coarse filtering of upstream flowing fluid utilized during the second flow direction during self-cleaning. Preferably opening 10a is utilized to gain access to and/or to replace and/or maintenance of the in-line filter ring 22, for example as shown in FIG. 8C. Preferably opening 10a is capped and/or sealed during filter use and may only be uncapped and/or unsealed for maintenance purposes of ring 22 when not in use.

Optional dedicated opening 12h may be utilized for associating with and/or incorporating a secondary handle or manual manipulator for controlling a portion of and/or an internal member of apparatus 100. For example, such a dedicated optional opening may be utilized for incorporating a spinning handle provided for manually spinning at least one of or both spine assembly 120 and/or filtering element 20.

Preferably first flow direction provides for filtering by allowing an upstream flow of an un-filtered flowing fluid to flow from an upstream source into housing 10 through inlet opening 12i and allowing the filtered flowing fluid to exit housing 10 through outlet opening 12o.

During first flow direction and filtering, an upstream flow of an un-filtered flowing fluid is received into housing 10 through inlet 12i, flowing into peripheral lumen 10L. Due to buildup of fluid pressure within housing 10, the un-filtered flowing fluid is thereafter forced to flow from peripheral lumen 10L across filtering element 20 associated with spine assembly 120, into inner lumen 120L, therein filtering the flowing fluid. Preferably in the process debris and waste is trapped along filtering element 20 allowing the now filtered fluid to pass into inner lumen 120L.

During self-cleaning, second flow direction is provided by allowing a flowing fluid, preferably from an upstream source and optionally from an external fluid source, to flow into housing 10 through inlet 12i is channeled into spine assembly 120, in particular spine legs 124, and out of housing 10 through flush exit opening 14f, allowing debris and filtered waste material to be flushed from the filtering element 20. Most preferably spine legs 124 are provided in the form of a hollow elongated tube having a plurality of spray nozzle orifices 124o along its length, therein allowing a flowing fluid to flow therethrough.

In order to facilitate both direction of flow filtering apparatus 100 comprises a fluid diverter 110 disposed internally within housing 10, most preferably within upper portion housing 12. Fluid diverter 110 is provided in the form of a valve body. Optionally fluid diverter 110 may be provided in the form of a two way valve body. More preferably fluid diverter 110 is provided in the form of a three-way valve body. Optionally fluid diverter 110 may be provided in the form of a four-way valve body. Optionally fluid diverter 110 may be provided in the form of a multi-way valve body having at least two ways about the valve body, and most preferably at least three or more ways available ways in the valve body.

Most preferably fluid diverter 110 provides for diverting the direction of flow between first flow direction and second flow direction. Therein diverter 110 provides for switching and determining the direction of flow within filter apparatus 100.

Optionally fluid diverter 110 may be fit with an in-line filter mesh ring 22 and/or screen, for example as shown in FIG. 8C, to provide for in-line filtering of the upstream fluid used during the self-cleaning mode. Optionally in-line filter mesh may be securely associated and/or coupled over the fluid diverter aperture and/or opening utilized during self-cleaning mode with the second flow direction. Optionally in-line filter mesh may be associated with fluid diverter 110 at any point along the path of the second flow direction utilized during self-cleaning mode.

Fluid diverter 110 is associated with and/or in fluid communication with outlet 12o, inlet 12i and spine assembly 120 particularly spine legs 124. Optionally and preferably fluid diverter 110 may be indirectly associated with and in fluid communication with flush exit opening 14f, most preferably via spine assembly 120 in particular via spine legs 124.

Flush exit opening 14f is most preferably disposed about lower portion housing 14. Preferably flush exit opening 14f is controlled with a flush valve 140. Optionally flush valve 140 may be provided as a valve integrated within housing 10 and optionally and preferably associated either directly or indirectly with fluid diverter 110, for example as shown in FIG. 1A.

Optionally flush valve 140 may be provided as a valve external to housing 10, for example as shown in FIG. 1B. Optionally an external flush valve 140 may be a manually operated valve or a remotely controllable valve for example including but not limited to a hydraulic valve, electronic valve, automatic valve, piezoelectric valve, flapper valve or the like as is known in the art. Optionally a remotely controllable flush valve 140 may be controlled by a controller 155.

Optionally and more preferably flush valve 140 may be opened seamlessly when apparatus 100 is in self-cleaning mode during the second flow direction, and seamlessly closed when assuming filtering mode utilizing the first flow direction, as depicted by the position of fluid diverter 110.

Optionally flush valve 140 may be associated with, directly or indirectly, and/or integrated with, fluid diverter 110 and its external controller 150 for example, via spine assembly 120. For example, manipulations of controller 150 may simultaneously bring about re-positioning of fluid diverter 110 within housing 10 and a movement, for example a rotation, of at least one spine assembly member, for example spine base 126, that is in turn directly associated with flush valve 140 causing flush opening 14f to change position from one position to another, open to close or close to open.

Optionally flush valve 140 may change position from one position to another, open to close or close to open, by associating with piston assembly 130 that may be associated with spine assembly 120. Optionally the status of the piston assembly 130 may be utilized to control flush exit opening 14f by association with flush valve 140. Optionally when piston assembly 130 is in compressed mode, flush valve 140 and flush opening 14f may assume the closed position, and while piston assembly 130 is in de-compressed mode flush valve 140 and flush opening 14f may assume the open position.

Apparatus 100 preferably comprises a piston assembly 130 that may be controlled directly or indirectly by the positioning of fluid diverter 110. For example, piston assembly 130 may be controlled by the changing fluid pressure within housing 10 during first flow direction and second flow direction. More preferably piston assembly 130 is associated with spine assembly 120. Most preferably piston assembly 130 is controlled to be normally closed, compressed, during filtration and open (de-compressed, released) during cleaning. Most preferably assembly 130 is decompressed when fluid is directed into spine assembly 120 about spine legs 124, indicative of self-cleaning flow direction through orifice 124o.

Optionally and more preferably piston assembly 130 comprises a compression plate 132 and compression spring 134, that function to maintain filtering element 20, provided in the form of a plurality of stacked ring disc filters, in compressed and/or stacked configuration along spine assembly 120, during filtering mode. Piston assembly 130 further provides for releasing the stacked configuration of disc ring filter elements 20, during cleaning mode, allowing the disc elements to separate and spin freely to enable flushing and cleaning of waste material filtered thereon.

FIG. 1A-B show optional configurations of apparatus 100,102 utilizing a dashed lead-line for example to show that optional sensors and/or controllers may be fit and/or associated with apparatus 100. Apparatus 100 may be utilized without any such sensors and/or controllers depicted by the dashed lead-lines.

Optionally apparatus 100 may be fit with and/or associated with at least one or more sensors for example including but not limited to flow meter and/or pressure sensors or the like. Optionally housing 10 may be fit with and/or associated with at least one or more sensors 152 for example in the form of a pressure sensor, flow-meter, or the like sensor provided to gauge at least one or more of pressure, flow, fluid pressure within housing 10. Optionally housing 10 may be associated with at least two or more sensors 152 dispersed about housing 10. Optionally a first sensor for example in the form of a flow meter 152 and/or pressure sensor may be associated with inlet 12i and a second flow meter and/or pressure sensor 152 may be associated with outlet 12o.

Optionally filtering apparatus 100 may be associated with a controller and/or microprocessor 155 or the like electronic means and/or computerized means for remotely and/or wirelessly and/or electronically and/or automatically and/or hydraulically, therein controlling the state and position of valve body 110, via valve controller 150 disposed externally to housing 10. Optionally valve controller 150 may be provided in the form of a motor for example in the form of a servo motor, water motor 160, or the like valve actuation means as is known in the art for example including but not limited to hydraulic, piezoelectric or the like.

In embodiments controller 155 may be provided to control the flow through bi-directional flow motor 160 so as to control the direction of flow through motor 160. Optionally and preferably controller 155 may be further functionally associated with to control at least one or more valves 156 to control the direction of flow through flow motor 160.

Optionally control of controller 155 may be facilitated by a computer, Personal Data Assistant (PDA), smartphone, mobile communication device, mobile processing device, server or the like utilizing optional communication means for example including but not limited to wired, wireless, cellular, optical, acoustic, ultrasound, radio frequency, contactless, near field (NFC), any combination thereof or the like.

The description below collectively refers to the embodiment depicted in FIGS. 2-6 showing various views of filtering apparatus 100 according to an optional embodiment of the present invention.

Figure 2D:
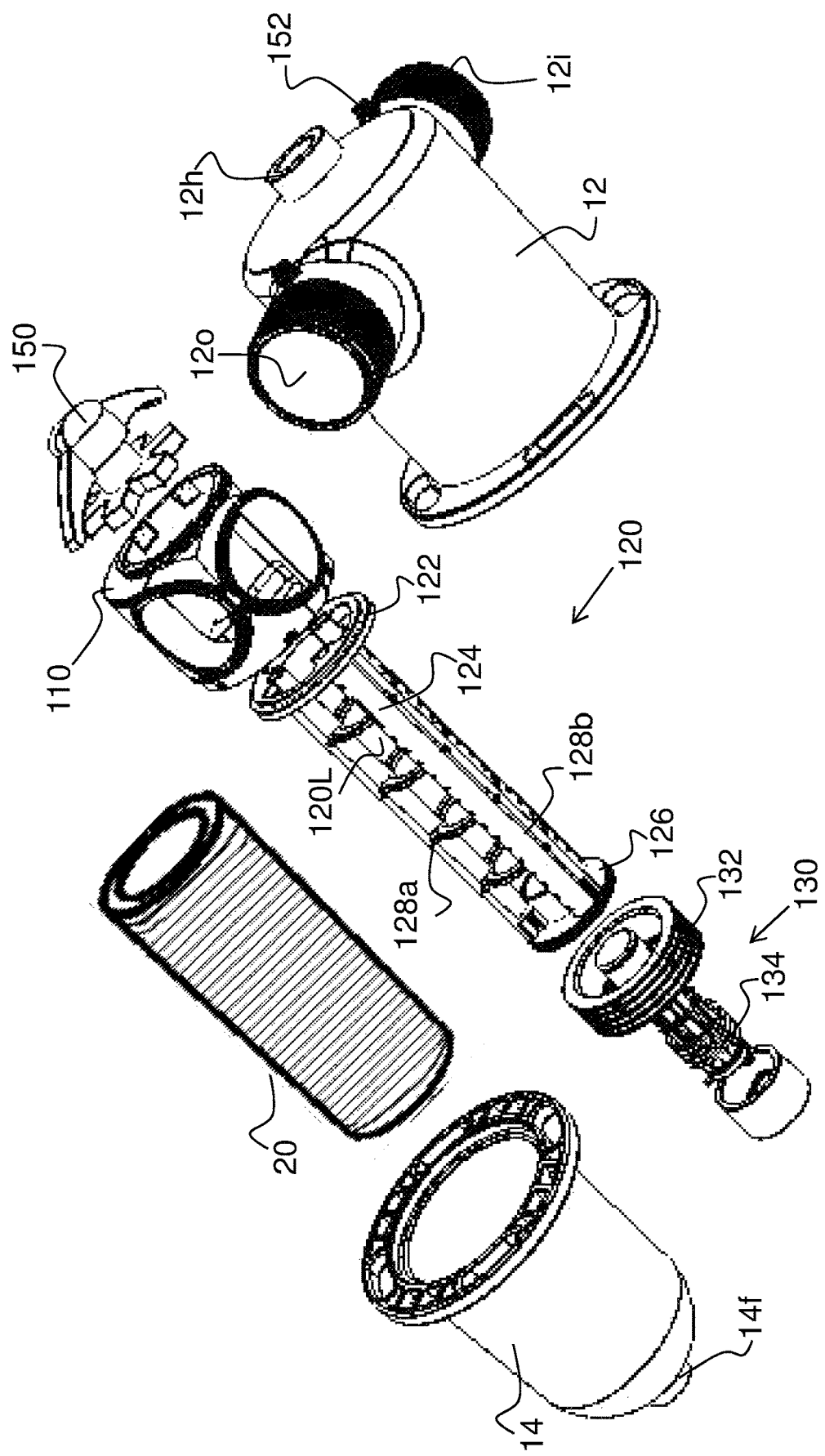

FIG. 2A-D provide various views of apparatus 100. FIG. 2A shows a perspective view of the assembled self-cleaning apparatus 100, providing an external view of two part housing 10, showing how upper housing portion 12 and lower housing portion 14 may be coupled and/or associated with one another.

FIG. 2A further shows housing 10 having an optional four opening configuration including the three standard opening inlet opening 12i, outlet opening 12o, flush exit opening 14f and additional optional handle opening 12h. Optionally and preferably handle opening 12h is provided for allowing valve controller 150 external to housing 10 to communicate with and control the position of fluid diverter 110 disposed internally to housing 10.

FIG. 2A further shows an optional location on housing 10 and in particular upper portion 12 where a flow and/or pressure sensor may be optionally associated with apparatus 10 for example about inlet 12i and outlet 12o.

FIG. 2B-C provide see through views of apparatus 100 revealing the various members that may be included in apparatus 100, FIG. 2B shows a perspective view while FIG. 2C shows a side view. FIG. 2B-C shows apparatus 100 comprising, fluid diverter 110, spine assembly 120, piston assembly 130, flush valve 140, and fluid diverter controller 150.

As shown, piston assembly 130 is disposed within the lower housing portion 14, over flush exit opening 14f and associated with lower housing 14 utilizing a plurality of piston assembly coupling member 14c. Coupling members 14c provided to center piston assembly within lower housing 14. Coupling members 14c further provide piston assembly 130 with the appropriate vertical positioning so as to provide sufficient room for the vertical movement required by piston assembly 130 to compress and decompress a plurality of disc filter elements 20 (not shown here) that may be stacked along the length of spine assembly 120. Optionally and preferably coupling member 14c further act as a guiding member and/or railing and/or stoppers and/or track to track and guide compression plate 132 during its vertical movement.

FIG. 2B-C further show the association and coupling between piston assembly 130 with spine assembly 120 along spine base portion 126 and with fluid diverter 110 at spine top portion 122.

Most preferably spine assembly is centered within the open lumen of housing 10, most preferably providing for compartmentalizing the open lumen of housing 10 into peripheral lumen 10L and internal lumen 120L. Most preferably this compartmentalization facilitates filtering a flowing fluid, as previously described.

FIG. 2D provides an exploded view of the view shown in FIG. 2A, of apparatus 100 clearly revealing the members associated with and forming filtering apparatus 100 as previously described. FIG. 2D provides a view of the different portion of spine assembly 120 comprising a base end 126 adapted for associating and coupling with piston assembly 130 and a top end 122 adapted for associating and coupling with fluid diverter 110. Spine assembly 120 further comprises a plurality of spine legs 124, radial support members 128a, and longitudinal support members 128b that are dispersed between top portion 122 and base portion 126. As shown most preferably spine legs 124 are preferably provided with cleaning spray orifices 124o provided to eject a flowing fluid under pressure toward filtering element 20 so as to clean it. Most preferably during self-cleaning and when filtering element 20 is provided in the form of a plurality of ring disc filter elements, that are un-stacked along the length spine assembly 120, the flowing fluid ejected from the plurality of orifices 124o disposed about the length of spine legs 124 causes the ring disc filter elements to spin, while cleaning the filtering elements outwardly toward the internal surface of housing 10.

FIG. 3A-B show schematic illustrations of the core filtering components as assembled within housing 10 of self-cleaning apparatus 100, housing 10 including upper housing 12 and lower housing 14 has been removed. FIG. 3A-B shows the core components including valve controller 150, fluid diverter 110, spine assembly 120, filtering element 20, piston assembly 130 and flush valve 140. FIG. 3A depicts the core components with filtering elements 20 while in FIG. 3B filtering element 20 has been removed to reveal spine assembly 120.

Figure 4A:
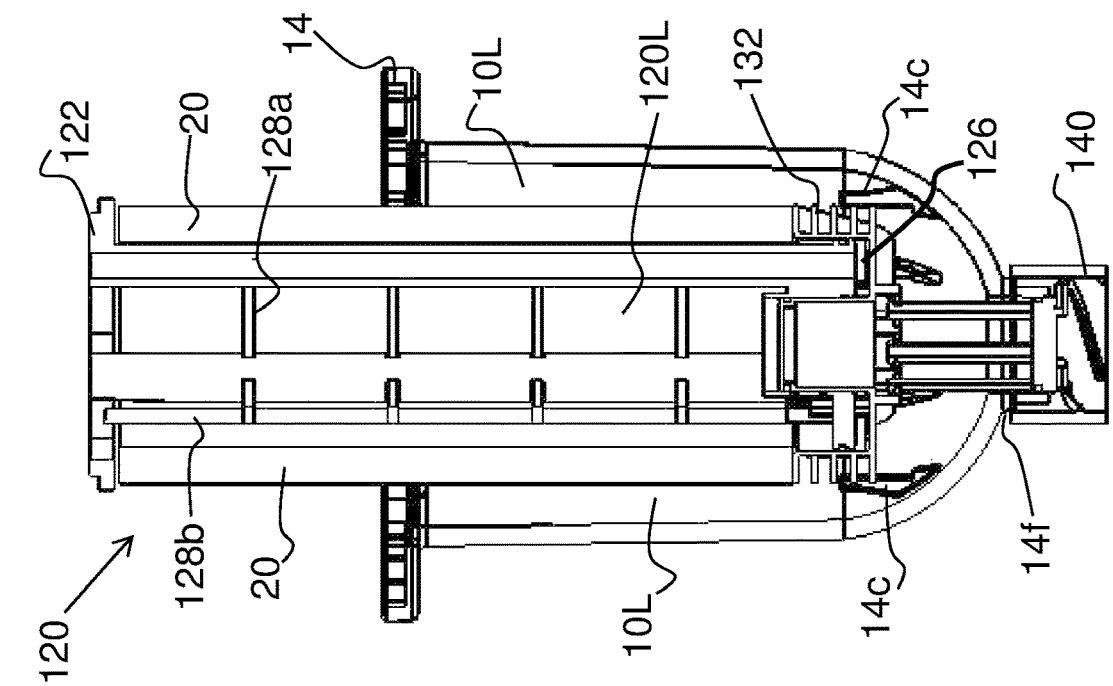
FIG. 4A-B are schematic illustration of the lower portion components forming the self-cleaning apparatus according to optional embodiments of the present invention.

FIG. 4A shows a schematic cross section view of the lower portion assembled filtering apparatus 100 comprising lower housing 14, filtering element 20, spine assembly 120 and piston assembly 130. FIG. 4A provides a depiction of inner lumen 120L and peripheral lumen 10L formed across filtering elements and spine assembly 120 at the lower portion of apparatus 100 as defined by lower housing 14.

Figure 4B:
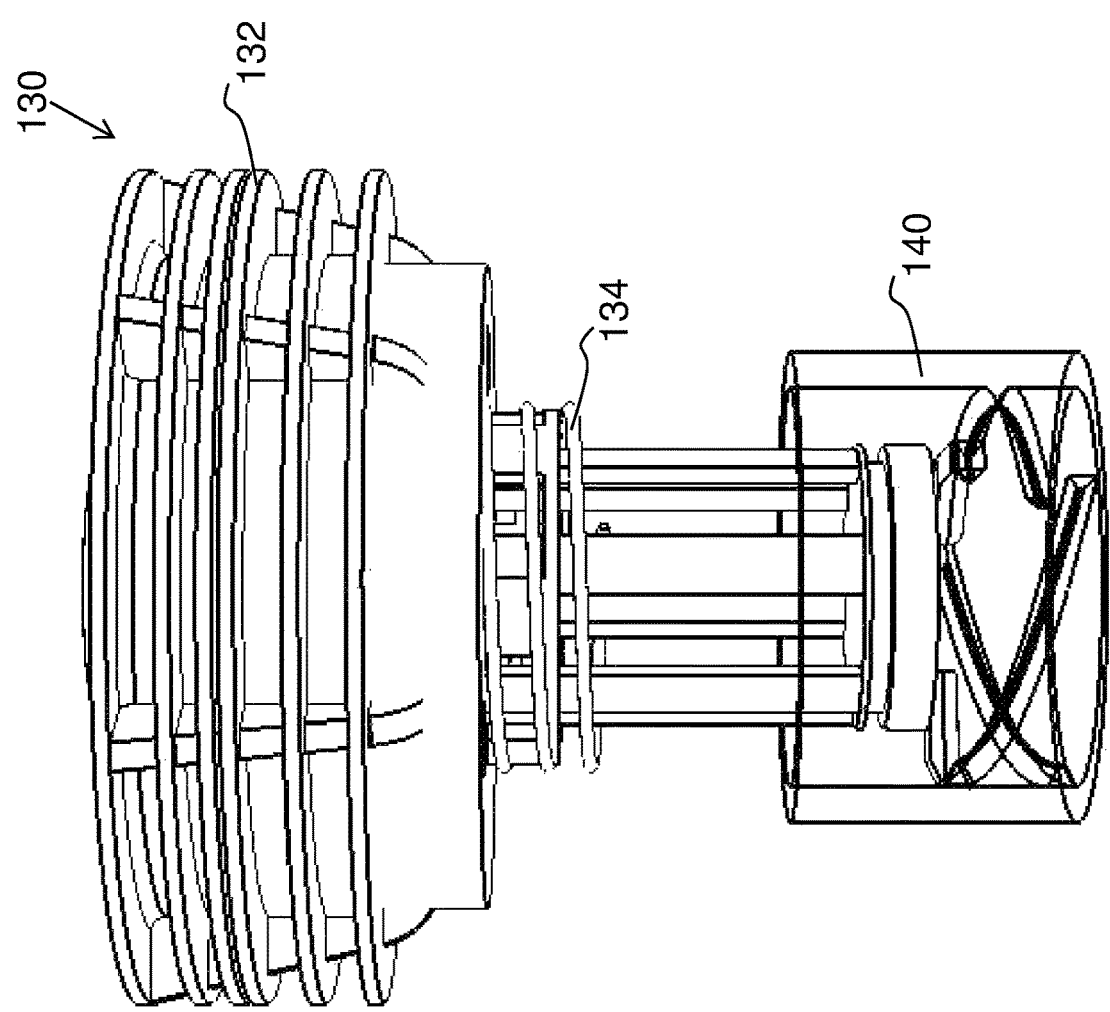

FIG. 4B provides a close up schematic illustration of piston assembly 130 showing compression plate 132 and compression spring that are utilized to compress and maintain filter element 20 provided in the form of a plurality of ring disc filtering elements in compressed forming a stacked configuration about spine assembly 120.

Figure 5A:
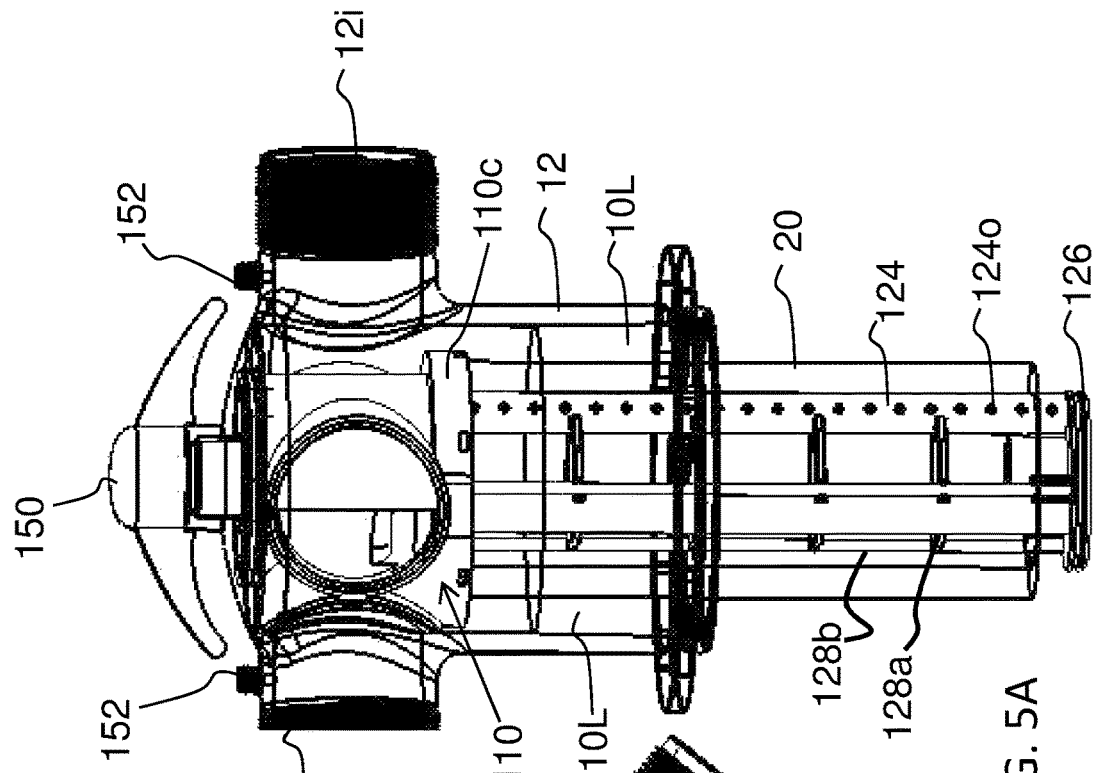
FIG. 5A-B are schematic illustration of the upper portion components forming the self-cleaning apparatus according to optional embodiments of the present invention.

FIG. 5A shows a see-through view of a schematic illustrative depiction of the upper portion assembled filtering apparatus 100 comprising upper housing 12, fluid diverter 110, valve handle 150, and spine assembly 120 and filtering element 20. FIG. 5A provides a depiction of inner lumen 120L and peripheral lumen 10L formed across filtering elements and spine assembly 120 at the upper portion of apparatus 100 as defined by upper housing 10.

Figure 5B:
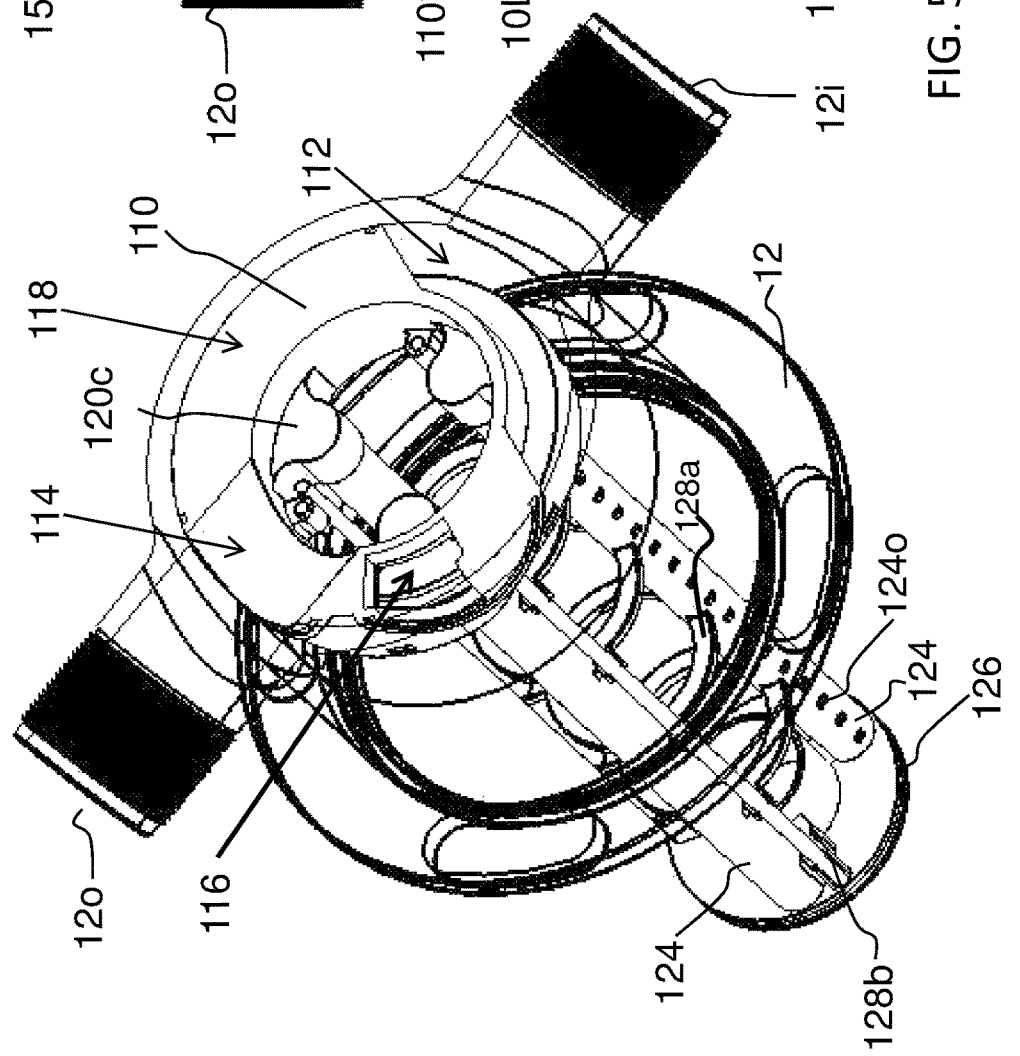

FIG. 5B provides a sectional view taken about the through fluid diverter 110 revealing the continuous inner lumen 120L formed from spine assembly 120 through to outlet 12o. The continuous inner lumen 120L provides for continuous flow of filtered flowing fluid from inner lumen 120L up to the outlet opening 12o and finally to the downstream target location.

FIG. 6A-H show various views of fluid diverter 110 according to a preferred embodiment of the present invention in the form of a three way valve body. The fluid diverter is characterized in that it is disposed internally within housing 10 within upper portion 12 and provides for control of the direction of fluid flow through filtering apparatus 100 in assuming a first flow direction during filtering and a second flow directing during self-cleaning. Fluid diverter 110 is configured to provide for self-cleaning from an upstream source utilizing the unfiltered fluid flow therein saving energy utilized in the filtering and cleaning process. Most preferably fluid diverter 110 is configured to maintain outlet 10o in closed position throughout the self-cleaning process therein ensuring that filtered flowing fluid is not wasted during the self-cleaning process.

The fluid diverter configuration according to the present invention overcomes the deficiencies of prior art self-cleaning filtering apparatus in that it does not utilize the downstream filtered flowing fluid for the filter cleaning operation and therefore saves water consumption require during the self-cleaning operations. Self-cleaning filter apparatus according to the prior art utilize a plurality of flow control valves that are disposed externally to a filtering assembly in order to allow appropriate control of the fluid flow for self-cleaning function. Such prior art external valves are expensive both to run and maintain utilizing energy in their operation. Furthermore by way of utilizing filtered downstream flowing fluid for the self-cleaning procedure prior art self-cleaning filtering apparatus both waste the filtered flowing fluid cleaning utilizing back flushing and therein waste the energy invested in filtering the upstream flowing fluid.

Optionally the configuration of fluid diverter 110 and any portion thereof may be configured in relation to and/or according to optional parameters associated with the filtering process it is facilitation. Such optional parameters may for example include but is not limited to pressure, upstream flow rate, the type of flowing fluid being filtered, flowing fluid properties, viscosity of the flowing fluid, size of apparatus 100, size of housing 10, type of flush valve 140, timing of flush valve 140, timing of piston assembly 130, any combination thereof or the like.

Figure 6B:
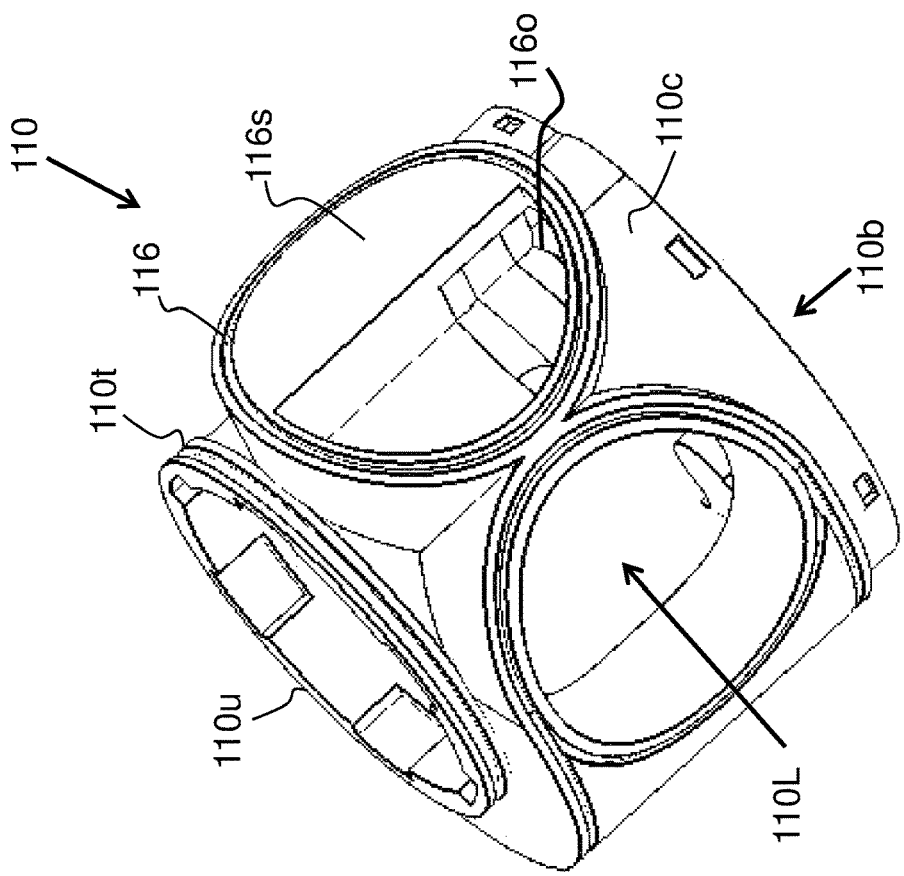
Figure 6A:
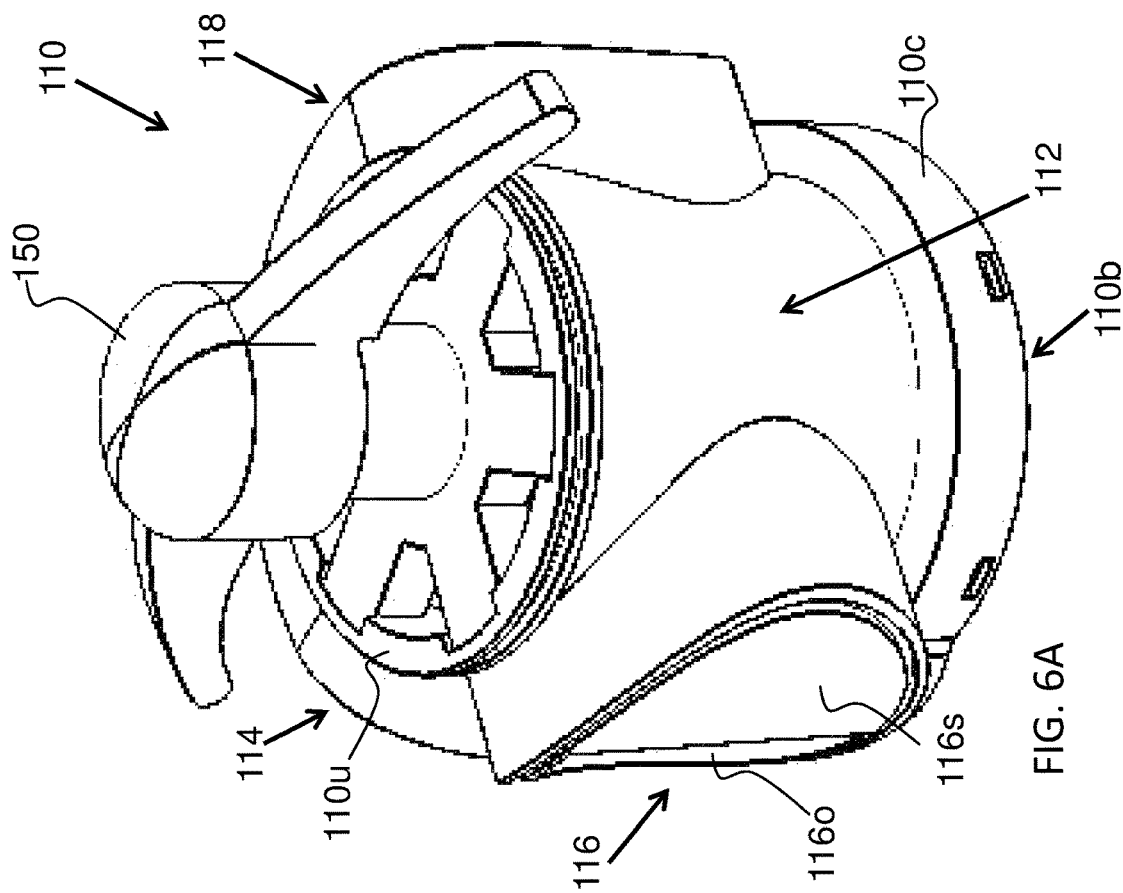

FIG. 6A shows a perspective view of fluid diverter 110 coupled with a valve control handle 150, wherein fluid diverter 110 is disposed within housing 10 while handle 150 is disposed externally with housing 10 via an optional handle opening 12h, as previously described. Most preferably handle 150 is provided for turning fluid diverter 110 to control the flow there-through.

As shown, optionally and preferably diverter 110 is a substantially cylindrical valve body having an upper face 110u, a lower face 110b and perimeter surface 110s. Most preferably the cylindrical body has a substantially open central lumen 110L.

Diverter upper face 110u may be adapted to securely associated within housing 10 at an upper portion thereof; for example about upper housing 12, for example with threading 110t, shown in FIG. 6B. Most preferably upper surface 110u is provided to optionally and preferably associate with a fluid diverter controller 150 disposed external to housing 10, for example as in the form of a handle as shown in FIG. 6A.

Figure 6C:
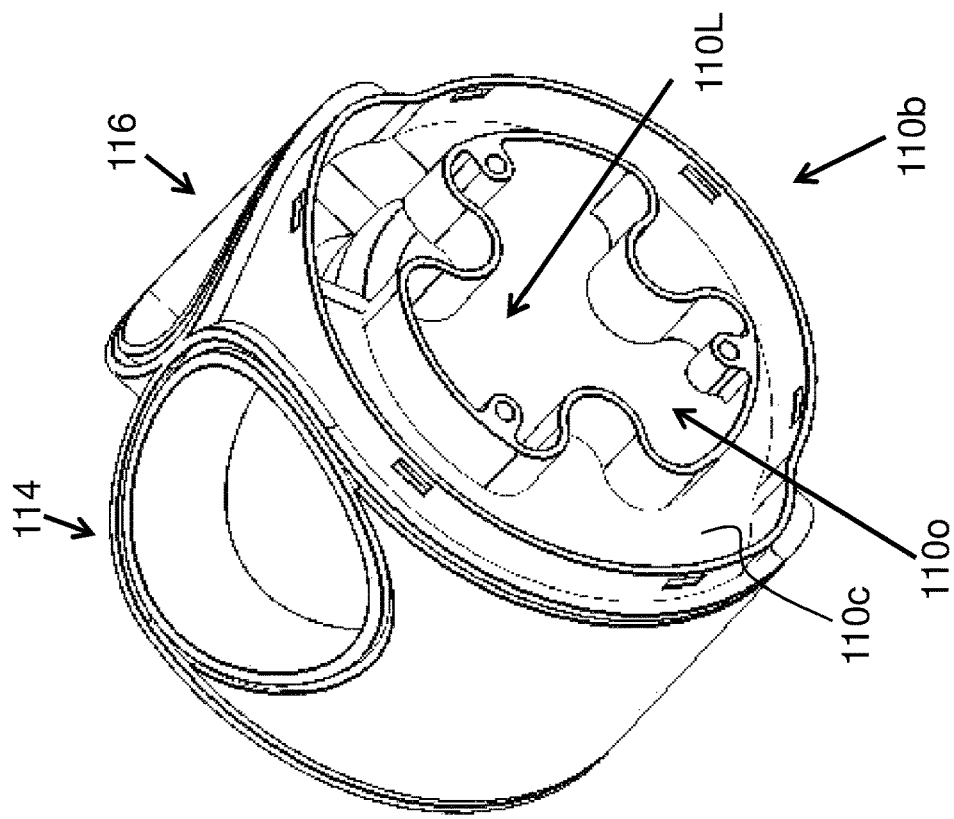
Figure 6D:
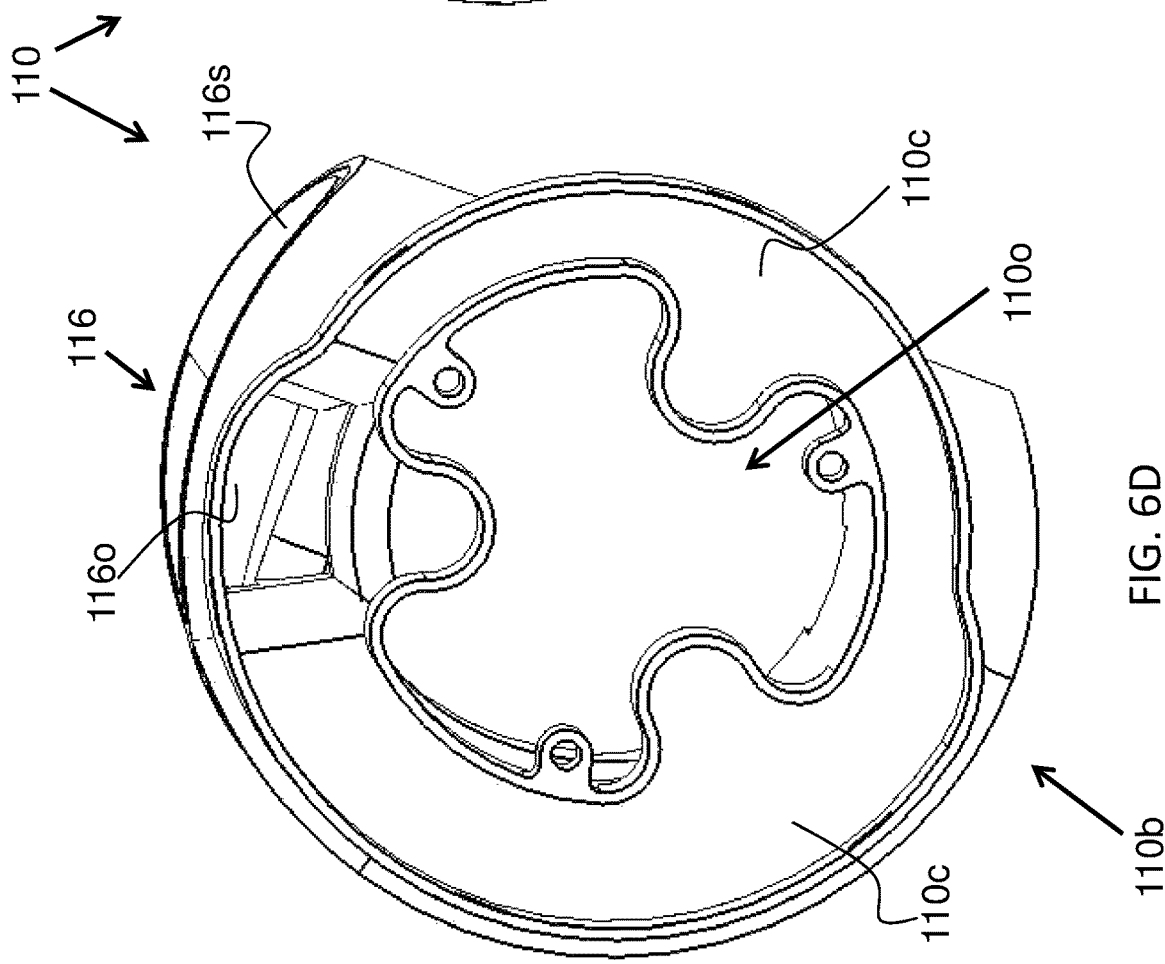

FIG. 6C-D, show diverter lower face 110b adapted to receive and securely fit with spine assembly 120 at its base end 122. Lower face 110b has a central opening 110o that is in fluid communication with the open central lumen 110L. Central opening 110o is preferably surrounded by a peripheral channel 110c disposed along the perimeter of lower face 110b. Peripheral channel 110c is preferably configured to receive and securely couple with spine assembly 120 at second end 122. Optionally and preferably central opening 110o is configured to be in fluid communication and continuous with inner lumen 120L. Peripheral channel 120c is configured to be in fluid communication with a plurality of spine legs 124 defining the spine assembly inner lumen 120L, providing for introducing a flowing fluid into the spine legs 124 that may flow out of orifices 124o.

FIG. 6E-6H show diverter perimeter surface 110p comprising a flow inlet portion 112, defined along surface 110p, and at least three apertures extending from the perimeter surface 110p including two open apertures 116, 114 and one closed aperture 118.

Preferably flow inlet portion 112 is configured to be opposite inlet opening 12i so as to allow the flow of an un-filtered flowing fluid into housing 10, preferably into peripheral lumen 10L, therein providing for the onset first flow direction during filtration. FIG. 6E shows a broken guiding line that outlines the area available to inlet portion 112 as upstream flowing fluid enters housing 10. The broken guiding line shows that a substantial portion of diverter 110 is allotted to inlet portion 112, for example up to about 50% of surface of perimeter surface 110p is allotted for inlet portion 112.

Preferably, first open aperture 114 along surface 110p is configured to align with and provide fluid communication between the outlet opening 12o and the central opening 110o defined on the diverter lower surface 110b through the open central lumen 110L, therein providing for the end portion of first flow direction during the filtering process that allows a filtered flowing fluid to flow out of housing 10 via outlet 12o. Aperture 114 is only open during the first flow direction during filtration and is sealed throughout the self-cleaning process.

Preferably, second open aperture 116 is configured to align with and provide fluid communication between the inlet opening 12i and the spine legs 124 via peripheral channel 110c disposed along diverter lower surface 110b. Such configuration preferably provides for the onset of the second flow direction during self-cleaning, and allows for the decompression of piston assembly 130 and optionally for the opening of flush exit opening 14f and flush valve 140.

Optionally flush exit opening 14f and flush valve 140 may be opened and closed manually or automatically as previously described. Optionally moving diverter 110 to the self-cleaning mode by associating aperture 116 with inlet 12i may also direct the mechanical movement or hydraulic opening of flush valve 140 and flush exit opening 14f, as previously described.

Optionally flush valve 140 may be opened manually by a user to initiate the self-cleaning process after diverter 110 has been set to the self-cleaning mode by maneuvering aperture 116 over inlet 12i.

Preferably when self-cleaning mode is initiated by maneuvering aperture 116 over inlet 12i, it allows piston assembly 130 to decompress as pressure is built-up down through spine legs 124 pushing compression plate 132 down and decompressing spring 134.

Figure 6F:
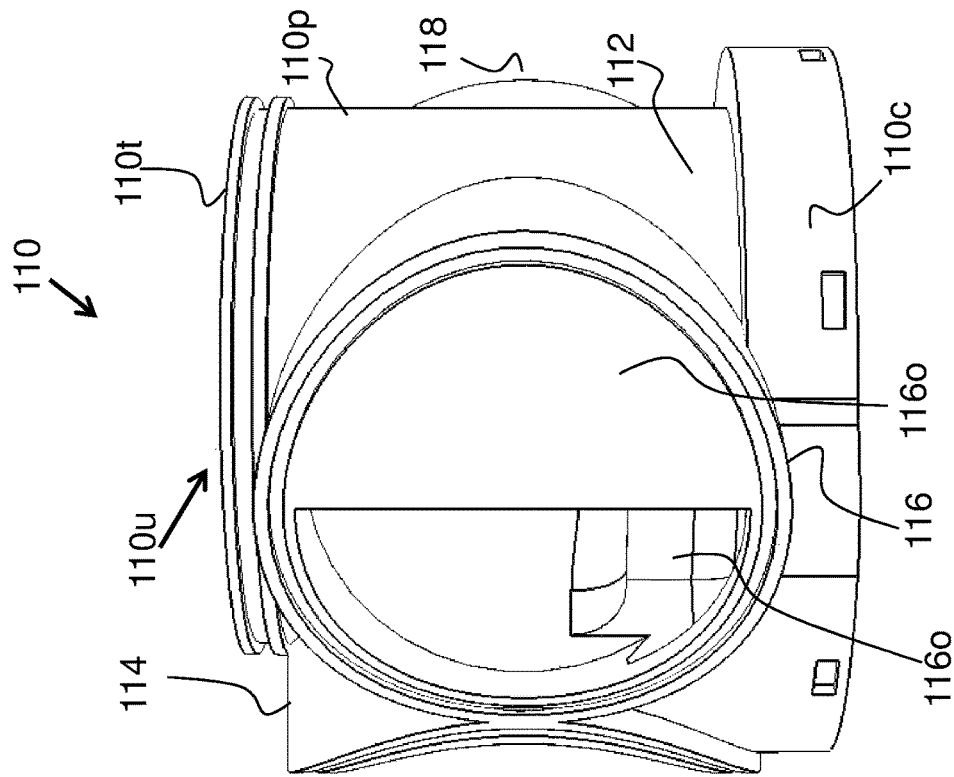
Figure 6E:
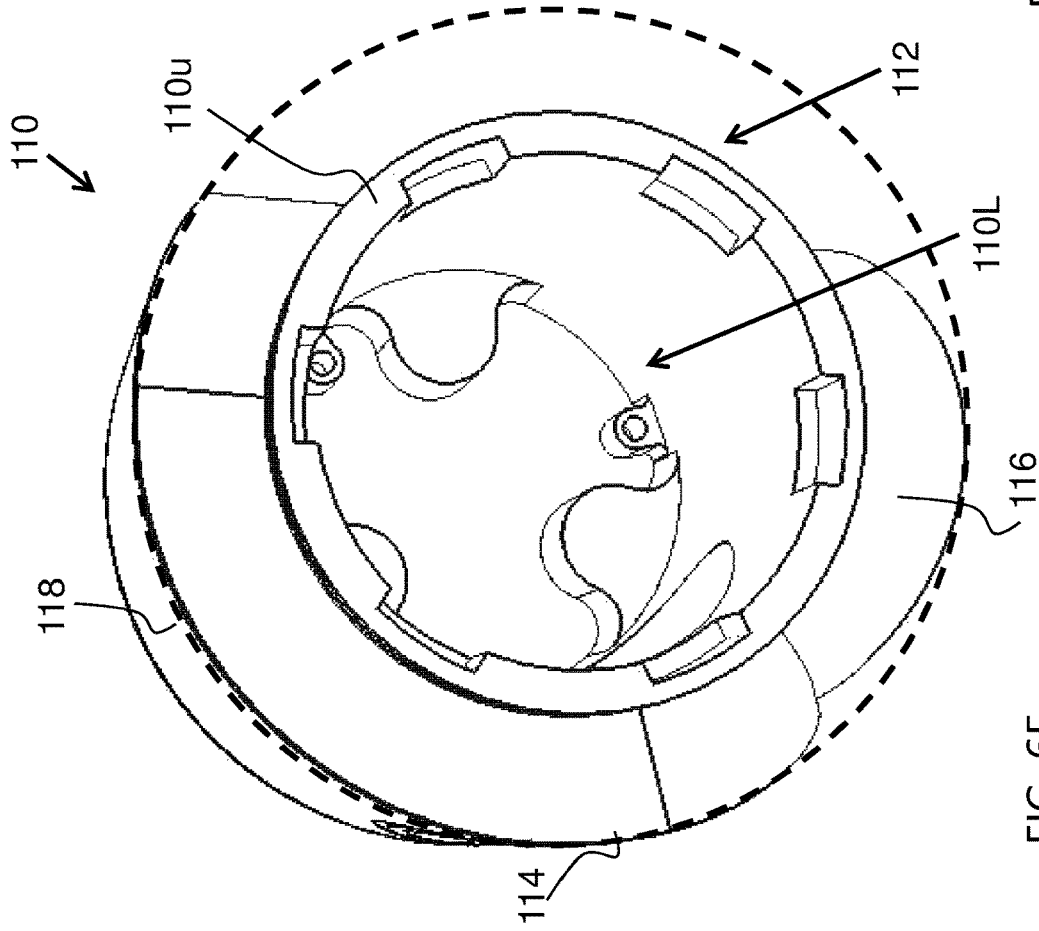

As shown in FIG. 6F, aperture 116 is a partially open aperture having an open portion 116o and a sealed portion 116s. Open portion 116o is in fluid communication with peripheral channel 110c, therein configured to allow upstream flowing fluid to flow into channel 110c and into the lumen of spine legs 124 and out orifice 124o. Sealed portion 116s is configured to quick stop the self-cleaning process ensuring sufficient recovery time when switching modes from self-cleaning mode back to filtering mode, allowing apparatus 110 to commence the filtering process only after flush opening 14f and flush valve 140 are closed and after piston assembly 130 is re-compressed.

Optionally and preferably the relative dimension, size and shape of the open portion 116o and sealed portion 116s of aperture 116 may be configured in relation to and/or according to optional parameters associated with the filtering process. Such optional parameters may for example include but is not limited to pressure, upstream flow rate, the type of flowing fluid being filtered, flowing fluid properties, viscosity of the flowing fluid, size of apparatus 100, size of housing 10, type of flush valve 140, timing of flush valve 140, timing of piston assembly 130, any combination thereof or the like.

Optionally the relative size and/or area of open portion 116o to sealed portion 116s may be controlled remotely, for example with a controllable shutter disposed about sealed portion 116s, that may optionally be controlled by and optional controller 155 optionally associated with apparatus 110, shown in FIG. 1A-B. Optionally a shutter disposed about sealed portion 116s may be controlled manually for example with a control handle 150 or via an optional member associated with handle 150.

FIG. 6G-H show closed aperture 118 that is configured to align with outlet opening 12o. Closed aperture 118 provides for sealing outlet opening 12o therein preventing loss of and ensuring the quality of the down-stream filtered flowing fluid during the self-cleaning mode. Sealing outlet 12o with aperture 118 therefore provides for redirecting the upstream flowing fluid from flowing into the housing; therein providing for the second flow direction during self-cleaning. As seen in FIG. 6G-H the size of both open aperture 114 and closed aperture 118 govern about a 25% of the size of diverter 110 where the majority of the sealed portion is associated with aperture 118 provided to ensure the quality of the down-stream filtered fluid.

FIG. 8A-B show an optional embodiment of the fluid diverter according to the present invention, showing various views of fluid diverter 210. Diverter 210 is similar to diverter 110 described and shown in FIG. 6A-H, diverter 210 is characterized in that aperture 216 is configured to have a concentric open portion 216o and sealed portion 216s. Open portion 216o is in fluid communication with peripheral channel 210c, therein configured to allow upstream flowing fluid to flow into channel 210c and into the lumen of spine legs 124, 224 and out orifice 124o, 224o. Most preferably orifice 216 is configured to receive an annular mesh filter 22, show in in FIG. 8C. Preferably mesh filter ring 22, is configured to securely associate with seal portion 216s. Mesh filter ring 22 is provided to filter upstream flowing fluid flowing through the filter spine assembly 120,220 and in particular spine legs 124,224 during the self-clean mode. FIG. 8A shows a perspective view while FIG. 8B shows a sectional view to reveal the passageway from opening 216o toward channel 210c.

Figure 15A:
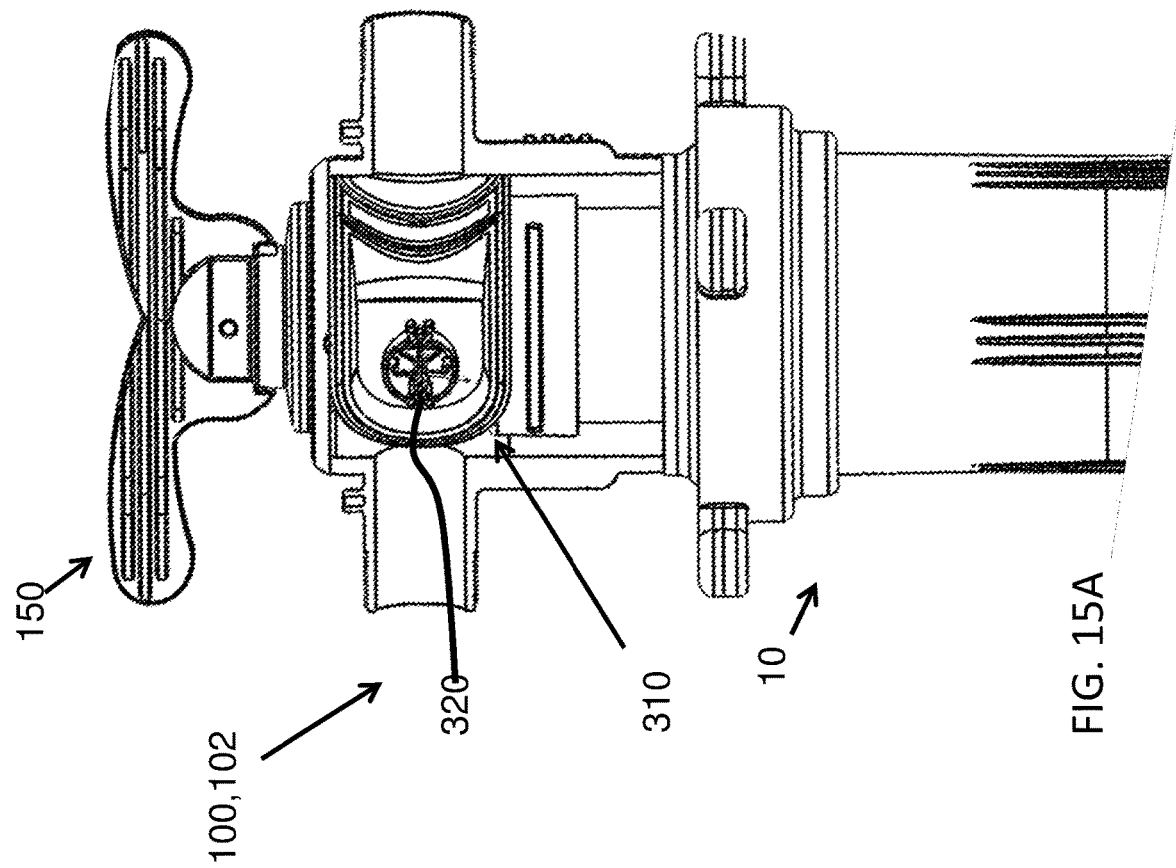
FIG. 15A-B show schematic illustrations of a filter comprising an internal fluid diverter featuring a pressure stabilizing assembly according to embodiments of the present invention.
Figure 15B:
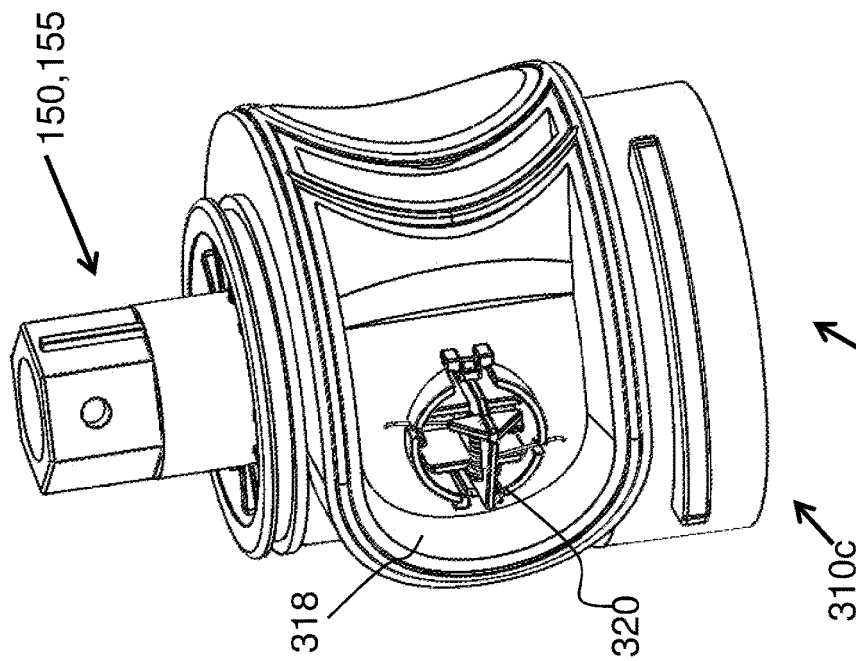

Now referring to FIG. 15-17 collectively showing an embodiment of a fluid diverter 310 that functions in a manner similar to the fluid diverter previously described 110, 210 above. Accordingly fluid diverter 310 has similar structures and body features as previously described and is coupled and/or associated with all filter assembly portions as is described above for example including but not limited to spine assembly, controller, flush valve assembly, filter housing. Accordingly for brevity, conciseness and ease of understanding only the differences between the previously described fluid diverters are specifically described below in connection with fluid diverter 310. For example, the apertures of all fluid diverters are similarly numbered including an inlet aperture 312 similar to inlet apertures 112 and 212, outlet aperture 314 comparable to outlet aperture 114, 214 and spine aperture 316 that is comparable to apertures 116, 216 as previously described and peripheral channel 310c that functions in the same manner and form as that described with respect to peripheral channel 110c, 210c.

Fluid diverter 310 is characterized in that it is a pressure relief fluid diverter that features a pressure relief piston assembly 320. The pressure relieve piston assembly 320 is disposed along a pressure relief aperture 318, similarly located as previously described apertures 218, 118.

FIG. 15A shows a cross sectional perspective view of a filter assembly 100,102 revealing the internal pressure relief fluid diverter 310 that feature pressure relieve piston assembly 320.

In some embodiments fluid diverter 310 may be controlled by way of a manual valve controller 150, for example in the form of a handle such as shown in FIG. 15A. As previously described valve controller 150 provides for rotating fluid diverter 310 so as to control the relative position of diverter 310 within the filter housing.

In some embodiment fluid diverter 310 may be controlled by way of an automated controller 155, for example in the form of a motor and/or flow motor 160, that is shown and described in FIG. 12-14.

As previously described valve controllers 150, 155 provide for rotating fluid diverter 310 internally within the filter housing and therefore controlling the different states and/or phases of the filter housing. Optionally controller 150 may be provided in the form of optional handles and/or automated controller 155 may for example be provided in the form of a flow motor 160.

FIG. 16A-E shows different face on views of pressure relief fluid diverter 310, each showing a different aperture and/or facet of diverter 310. FIG. 16A shows a face on view of pressure relieve aperture 318 with pressure relief assembly 320 in place. FIG. 16B shows a similar face on view, however pressure relief assembly 320 has been removed to reveal pressure relief opening 318o and coupling member 318c of aperture 318 provided so as to fit with and house and/or receive pressure relief assembly 320. Most preferably pressure relief piston assembly 320 provides for controlling the open and close status of opening 318o.

In embodiments coupling member 318c are provided to facilitate coupling and/or associating pressure relief assembly 320 over opening 318o.

In embodiments opening 318o may be have a diameter of about 35 millimeter (mm). In embodiments opening 318o may be have a diameter of from about 15 millimeters (mm) and up to about 50 millimeters (mm).

FIG. 16C shows a face on view of spine aperture 316 having a spine aperture open portion 316o that functions in the same manner and having similar form to apertures 116, 216 and openings 116o, 216o as previously described therefore for the sake of conciseness will not be detailed here.

FIG. 16E shows a face on view of inlet aperture 312 that functions in the same manner and having similar form to apertures 112, 212 as previously described therefore for the sake of conciseness will not be detailed here.

FIG. 17A-E show various close up views of pressure relief piston assembly 320 removed form fluid diverter 310. FIG. 17A and FIG. 17B show different perspective views of assembly 320 while FIG. 17C-17E show an exploded view revealing the different functioning part of piston assembly 320.

Pressure relief piston assembly 320 comprises housing 324 (FIG. 17C), spring 326 (FIG. 17D), piston body 328 (FIG. 17E). In some embodiments housing 324 may be provided as an integrated with aperture 318 to form opening 3180.

FIG. 17D shows an optional form of spring 326 having the form of a torsion spring including two free ends 326c and a central spring body 326a. Spring 326 is fit across both body 328 and housing 324 wherein free ends 326c fit with housing 324 at a dedicated spring recess 324d; while spring body 326a fits with piston body 328 being received in a dedicated spring housing 328c, as shown in FIG. 17E.

FIG. 17C shows piston assembly housing 324 having at least two spring recesses 324c, and at least two holding pegs 324. Housing 324 having a generally cylindrical body including a (inner) distal end 324i that is configured to be continuous with opening 318o and a (outer) proximal end 324o configured to be adjacent with the external surface of fluid diverter 310 more specifically the external surface of aperture 318. Spring recesses 324c provide for receiving an end of spring 326c. Holding pegs 324d have an outer surface 324a provided for coupling with and/or holding and/or receiving coupling member 318c disposed about opening 318o, for example as shown in FIG. 16B. Holding pegs 324d having an inner surface 324b along for coupling and/or associating and/receiving at least a portion of piston body 328, more preferably at least one or more coupling fins 328d. Accordingly holding pegs 324d provide for securing assembly 320 with coupling member 318c over opening 318o and body 328 via coupling fins 328d.

FIG. 17E shows a perspective view of piston body 328. Body 328 having an outer end surface 328a, an inner end surface 328b, a spring housing recess 328c, holding fins 328d, a seal recess 328e, and central body 328f. In embodiments when body 328 is seated within housing 324, as shown in FIG. 17A-B, inner end surface 328b is provided for matching with inner surface 324b and therefore collectively sealing and/or closing opening 318o. Body 328 features a seal recess 328e adjacent to inner end surface 328b, where recess 328e provides for receiving a seal (not shown) increasing the closure over opening 318o.

Spring housing recess 328c provides for receiving spring body portion 326a.

Holding fins 328d are preferably adjacent to inner end surface 328b and provide for coupling body 328 with housing 324 as described above. Optionally holding fins may be oriented to be normal and/or perpendicular to central body 328f, for example as shown.

Central body 328f defines the central body of piston body 328 that defines the length of piston body 328 and therefore spans between inner end surface 328b and outer end surface 328a. Preferably the outer edge of central body 328f defines the outer end surface 328a of body 328, for example as shown. In embodiments, end surface 328a is preferably configured to extends beyond the outer proximal end 324o of housing 324, for example as shown in FIG. 17A-B, so as to allow end surface 328a to extend beyond the external surface of fluid diverter 310 and more specifically the external surface of aperture 318, so as to approximate with the inner surface of upper housing 12 covering fluid diverter 310. In some embodiments the contour of end surface 328a may be configured according to the curvature and/or geometry of the inner surface of upper housing 12.

A pressure relief piston assembly 320, such as the one described above according to an optional non limiting embodiment of the present invention, is utilized to allow for more readily manipulating an internal fluid diverter 310 with optional controllers, for example a manual controller 150, or a motorized and/or automated controller 155, for example in the form of a flow motor 160 described herein, and/or the like motor assembly. More specifically pressure relief piston assembly 320 provides for relieving any pressure differential buildup that may be established across fluid diverter during the filter's (100,102) transition between the filtering phase to the self-cleaning phase, and vice versa. More specifically, pressure relief piston 320 when disposed over aperture opening 318o allows a smooth and manageable transition between filtering phase and self-cleaning phase as a high pressure differential may build up in and around aperture 318, 118, 218 near the end of the filtering phase and just prior to the self-cleaning phase. Accordingly a preferable solution to the pressure build up is to alleviate the pressure build up is provided by piston assembly 320 that allows for pressure equalization during the filtering phase between aperture 318 and outlet aperture 314. In so doing the resultant pressure relief allows for more readily manipulating controller 150,155, for example a manual handle, lever and/or an automated motor and/or flow motor 160, by way of greatly reducing the force required to turn fluid diverter 310.

Pressure equalization is provided by allowing piston assembly 320 to gradually determine the open/close status of opening 318o, therein allowing a more fluid transition from an open state to a close state. Such fluid and/or gradual transition relieve the pressure buildup allowing the pressure build up to be gradually relieved, therein substantially reducing the force required to manipulate controller 150, 155, for example a manual handle, lever and/or an automated motor and/or flow motor 160.

For example, during filtering phase piston assembly 320 is in the open configuration where outer end surface 328a is pressed against the inner surface of upper housing 12 therein causing central body portion 328f to displace inwardly against spring 326 that in turn further urges inner end surface 328b to displace inwardly to open opening 318o, allowing for pressure equalization between outlet aperture 314 and aperture 318 as both are exposed to downstream water flow. In embodiments the displacement of piston body 328 relative to housing 324 is about 10 millimeters (mm).

In embodiments piston assembly 320 may be configured to provide linear movement from about 5 mm and up to about 25 millimeters (mm) so as to control the open/close status of opening 318o. In embodiments the displacement of piston assembly 320 may be configured relative to the biasing force spring 326.

In embodiments the displacement of piston assembly 320 may be configured relative to the fluid pressure available to the filter.

During self-cleaning phase the opposite occurs where opening 318o is closed and remains closed as spring 326 does not have a counter force, as was the case during the filtering phase, and therefore automatically shuts opening 318o with inner end surface 328b.

During the transition between filtering phase and self-cleaning phase pressure relief assembly 320 maintains pressure equalization between outlet aperture 114 and aperture 118 until the outlet aperture 114 is closed. Once aperture 114 is closed, spring 326 urges central body 328f inwardly to close of opening 118o with inner end surface 328b. Therefore assembly 320 by maintaining pressure equalization between aperture 114 and 118 for an extended period time allows for readily turning fluid diverter 310.

FIG. 9A-C show optional views of a spine assembly 220 according to an optional embodiment of the present invention. FIG. 9A shows a perspective view of spine assembly 220 that is similarly structured as spine assembly 120 as previously described. Spine assembly 220 having a plurality of spine legs 224 including a plurality of spray orifice 224o provided to expel flowing fluid during the self-cleaning mode. Spine assembly 220 further comprises support members 228a, 228b similar to support members 128a, 128b as previously described. Optionally radial support members 228a may be configured to act as turbine blades, for example as shown in top down view FIG. 9C, to facilitate rotation of spine assembly 220 and the disc filter medial 20 associated thereon.

Spine assembly 220 has a second end 222 and first end 226 similar to second end 122 and first end 126 of spine assembly 120 as previously described. Second end 222, shown in FIG. 9C is provided for coupling with optional fluid diverters 110, 210 and comprises a spine connecting channel 220c to channel flowing fluid into spine legs 124, 224 from peripheral channel 110c, 210c.

Spine assembly first end 226, best shown in FIG. 9B, features an adaptor housing 226p, provided for receiving at least a portion of adaptor 236, shown in FIG. 10. As previously described with respect to first end 126, first end 226 functions to couple and/or associated spine assembly 120,220 with piston assembly 130,230. Preferably adaptor housing 226p provides for receiving and housing adaptor 236, an example of which is shown in FIG. 10, that facilitates coupling between spine assembly 120,220 and piston assembly 130,230.

Preferably adaptor 236 provides for harnessing the rotational motion of diverter 110,210 and spine assembly 120, 220, provided with controller 150, to actuate the configuration of piston assembly 130,230. Therefore adaptor 236 allows piston assembly 130, 230 to stack (compress) or un-stack (release) disc filtering elements 20, during the filtering and self-cleaning modes respectively, based on the position fluid diverter 110,210 as depicted by controller 150.

FIG. 10 shows adaptor 236 having a bolt like body comprising a head portion 236a and a tail portion 236b. Head portion 236a provides for associating with spine assembly 120,220 preferably along first end 126,226, for example within housing 226p. Optionally head portion 236a may comprise at least one or more coupling members 236c, for securely associating adaptor 236 within housing 226p.

Tail portion 236b provides for associating with piston assembly 130, 230. Tail portion 236b preferably features threading and/or groove 236t provided for coupling with corresponding threading and/or rail guides 232t, FIG. 11B, disposed with piston assembly 130, 230 to facilitate actuating the state and/or configuration of piston assembly 130, 230.

FIG. 11A-D, shows optional views of piston assembly 230, that functions similar to piston assembly 130, as previously described. Piston assembly 230,130 provide for controlling the compression state of disc filters 20 along spine assembly 120,220 while preferably controlling the flush opening 14f so as to open flush opening during self-cleaning mode and closing it during filtration mode.

Figure 11A:
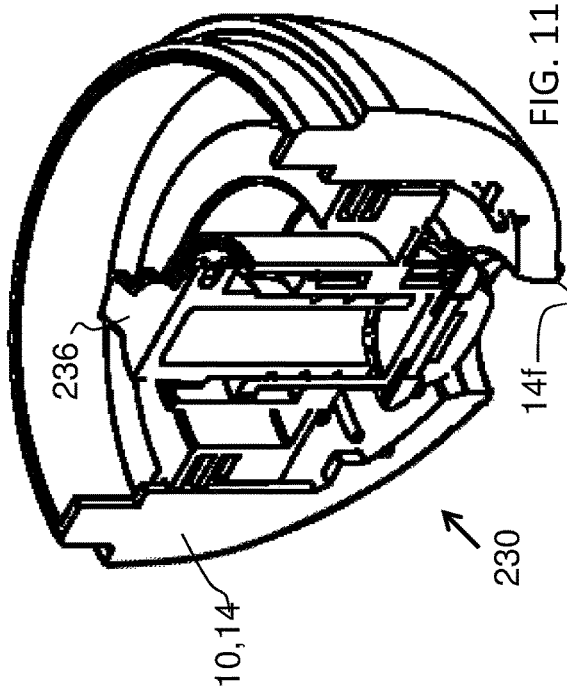
FIG. 11A-D are schematic illustration of optional lower portion components forming the self-cleaning apparatus according to optional embodiments of the present invention.
Figure 11C:
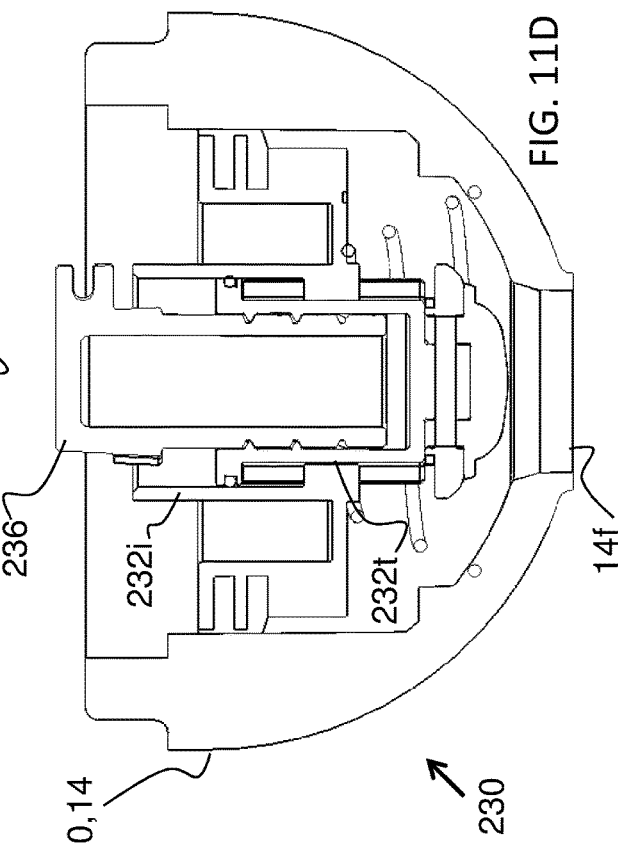
Figure 11B:
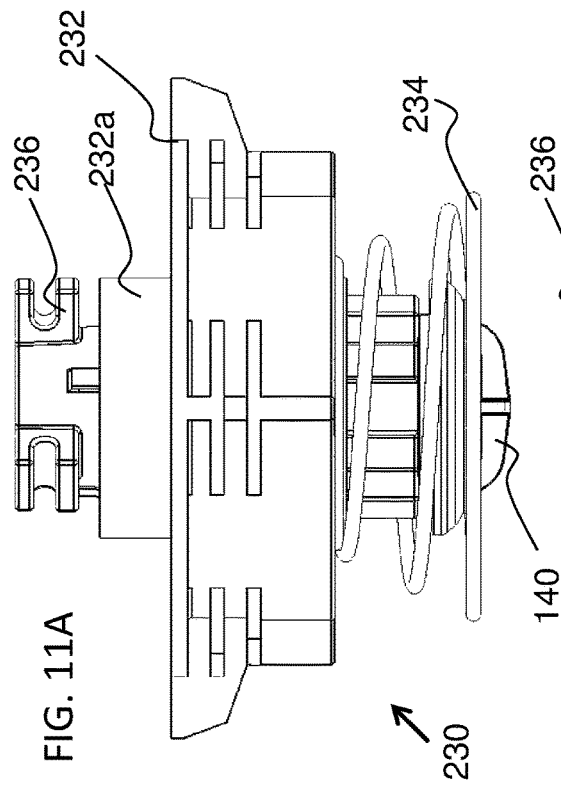
Figure 11D:
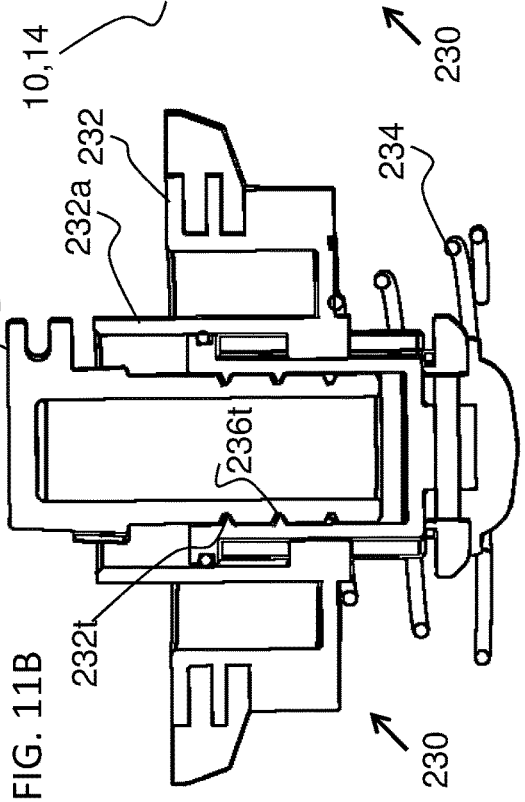

FIG. 11C-D show sectional views of piston assembly 230 as it is disposed within housing 10, about lower portion 14 over flush opening 14f. FIG. 11C-D show piston assembly in the self-cleaning mode while flush opening 14f is open.

FIG. 11A-B shows different view of piston assembly 230, that functions similarly to piston assembly 130 as previously described therein featuring a compression plate 232, 132 and spring 134,234. Optionally and preferably as previously described assembly 130,230 may be coupled with an internal flush valve 140, for example in the form of a plug as shown, to control the state (open/close) of opening 14f.

Piston assembly 230 feature a compression plate adaptor housing 232a for receiving at least a portion of adaptor 236, FIG. 10, as previously described. Preferably housing 232a is configured to receive tail portion 236b. Preferably housing 232a comprises threading and/or rail track 232t configured to correspond with rail and/or adaptor threading 236t.

Figure 12B:
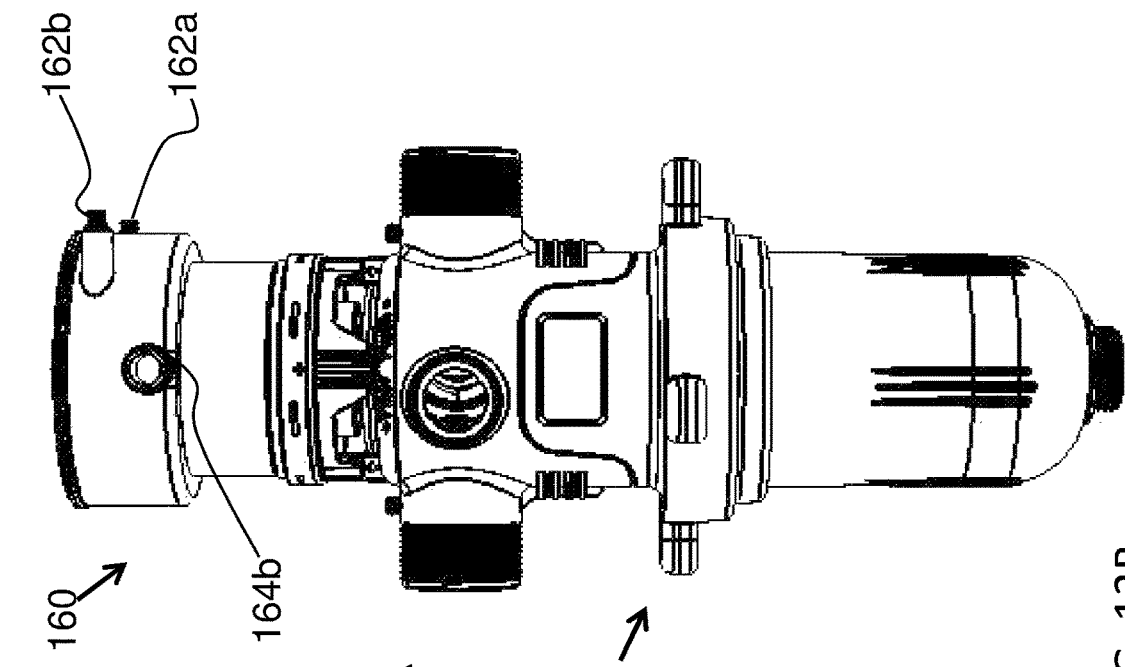
FIG. 12A-B are schematic illustration of an exemplary self-cleaning apparatus according to an embodiment of the present invention utilizing flow motor to control the internal fluid diverter according to embodiments of the present invention.
Figure 12A:
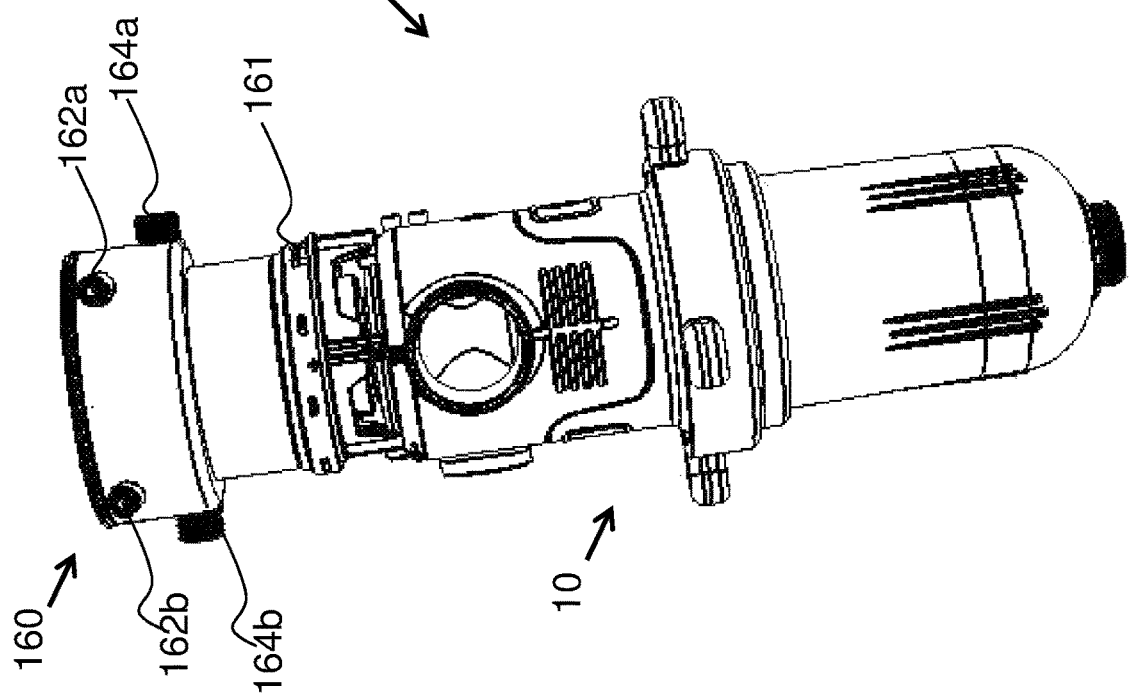

FIG. 12A-B show perspective views of an optional embodiment of filter assembly 100,120 fit with a bi-directional flow motor 160 provided for controlling the position of internal fluid diverter 110. Preferably bi-directional flow motor 160 is utilized to turn fluid diverter 110 so as to change the direction of flow through the filter body and to effectively switch between filtering phase and self-cleaning phase as previously described. Accordingly bi-directional flow motor 160 can turn fluid diverter in both the clockwise and counterclockwise directions so as to control the position of the fluid diverter 110.

Most preferably bi-directional flow motor 160 utilizes controllable flow valves 156 that may be controlled with a controller 155 to determine the direction of flow through bi-directional flow motor 160, as schematically depicted in FIG. 1A-B.

FIG. 13A-B show a close up view bi-directional flow motor 160. FIG. 13A shows a perspective view of bi-directional flow motor 160 having a housing 161 that is securely coupled with a portion of filter housing 10 of filter 100,102 so as to provide access to the location of fluid diverter 110. Most preferably housing 161 is coupled over upper housing 12 so as to provide access to fluid diverter 110.

Flow motor 160 comprises at least two flow inlets 162 including inlet 162a and 162b each inlet providing an individual flow direction, clockwise or counter-clockwise. In embodiments flow through inlets 162 is preferably controlled with a controllable valve 156 that may be controlled with controller module 155. Optionally each inlet may be controlled with an individual valve 156. Optionally both inlets may be controlled with a multi-directional valve 156 such that the inlet in use 162a or 162b is controlled with a single multi-directional valve 156.

Flow motor comprises at least one flow outlet 164, and optionally two flow outlets 164a, 164b as shown wherein each flow outlet having a corresponding to a flow inlet 162a, 162b.

FIG. 13B shows a cross section of flow motor 160 revealing the internal compartments of bi-directional flow motor 160 including flow turbine module 166; and diverter coupling adaptor 170. In embodiments flow motor may optionally further comprise a gear and clutch module 168.

Turbine module 166 provides a turbine for utilizing the flow energy to generate bi-directional motion by utilizing flowing fluid entering housing 161 through inlet 162 and out through outlet 164. Preferably turbine 166 is a bi-directional turbine that rotates both in clockwise and counterclockwise direction based on the flow inlet 162 utilized to rotate bi-directional turbine vanes 165. Most preferably turbine 166 is functionally coupled with adaptor 170 such that the rotational motion provided by turbine module 166 is converted to rotational motion of adaptor 170 in-turn causing adaptor 170 to controllably rotate fluid diverter 110 in the required direction Optionally bi-directional turbine vanes may be provided in dual and/or "back to back" spoon and/or cup shape form, for example as shown in FIG. 14A-B.

In an optional embodiment the rotational energy provided by turbine module 166 may be amplified via an optional gear and clutch module 168 so as to provide adaptor 170 with sufficient power to controllably turn so as to cause fluid diverter 110 to turn in the required direction.

FIG. 14A-B provide a close up view of schematic bi-directional turbine vanes 165 shown in the form of dual cup vanes. Each vane 165 is formed from two cups and/or curved member that are coupled to one another back to back so as to form two individual surfaces configured to receive a fluid flow causing the turbine to rotate in one of two directions clockwise or counterclockwise depending on the flow inlet utilized. Accordingly bi-directional cup vanes 165 enable bi-directional rotation of flow motor 160 both in the clockwise and count-clockwise directions.

In turn, the rotational motion provided by turbine module 166 is converted to mechanical motion of module 170, optionally with gear and clutch module 168, so as to cause fluid diverter 110 to turn in the appropriate direction to determine the direction of flow through filter housing 10 and the filter phase, self-cleaning or filtering as previously described.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

While the invention has been described with respect to a limited number of embodiments, it will be appreciated that many variations, modifications and other applications of the invention may be made.

What is claimed is:

1. A filtering apparatus having a filtering mode and a self-cleaning mode, the apparatus provided for filtering an upstream flowing fluid with filtering elements in the form of a plurality of stackable discs during filtering mode utilizing a first flow direction, apparatus also configured to self-clean said filtering elements with said upstream flowing fluid during self-cleaning mode utilizing a second flow direction, the apparatus encased within a housing including an internal fluid diverter for controlling the flow through said housing, a central spine assembly for housing said plurality of stackable discs, and a piston assembly for controlling the configuration of said plurality of disc filters along said disc filer spine;

a. said housing comprising at least three openings to allow said first flow direction during filtering mode, and said second flow direction during self-cleaning mode, said at least three openings including an inlet opening for receiving upstream unfiltered fluid, an outlet for receiving downstream filtered fluid and a flush exit for removing filtered waste materials, wherein the flow through said housing between said openings is controlled by the position of a fluid diverter disposed internal to the housing;

b. said spine assembly provided for holding said plurality of filtering elements both in a stacked configuration during filtration mode and an un-stacked configuration during self-cleaning mode; said spine assembly having a first end and a second end; said spine assembly associated at the first end with the piston assembly, the piston assembly having a closed configuration during filtration mode, and an open configuration during self-cleaning mode; wherein the closed configuration of said piston assembly provides for maintaining said filtering elements in a stacked formation along the length of said spine during filtration; and wherein said piston assembly open configuration provides for un-stacking said filtering elements during self-cleaning mode to facilitate flushing waste materials through said flush exit; wherein said piston assembly is actuated by the position of said fluid diverter;

c. said spine assembly is associated at the second end with said fluid diverter provided in the form of a valve body; wherein said fluid diverter is controlled externally to said housing with a controller; said fluid diverter having two states for actuating between filtering mode and self-cleaning mode, the fluid diverter having a dedicated aperture in fluid communication with a peripheral channel utilized during self-cleaning mode, said dedicated aperture is configured to receive a flowing fluid that is diverted to said peripheral channel and into a plurality of spine legs of said spine assembly wherein said spine legs have orifices defined along its length, said orifices are used to jet fluid so as to clean said plurality of disc filters; and d. a bi-directional flow motor that is configured to run on available upstream flowing fluid for controlling said controller and therein the position of said fluid diverter, wherein said bi-directional motor is coupled to said housing along said upper portion and is functionally associated with said fluid diverter; wherein said bi-directional flow motor comprises:

i. a housing adapted to be securely coupled to an upper portion of said filter housing;
   ii. said housing featuring at least two flow inlet and at least one flow outlet; wherein a first inlet provides fluid flow for clockwise rotation and a second inlet provides fluid flow for counter-clockwise rotation;
   iii. a flow turbine module configured to for receiving said flowing fluid from one of said at least two flow inlets; and
   iv. wherein said flow turbine module is functionally coupled with a fluid diverter adaptor that is functionally coupled with said internal fluid diverter so as to rotate said fluid diverter in the clockwise or counterclockwise directions.

2. The apparatus of claim 1 wherein said flow turbine module is functionally coupled with a gear and clutch module provided to amplify the power provided by said flow turbine module; and wherein said gear and clutch module is functionally coupled with said fluid diverter adaptor.

3. The apparatus of claim 1 wherein said at least two inlets are in fluid communication with a controllable valve to select which of said two flow inlets are active.

4. The apparatus of claim 1 wherein said flow turbine module comprises a plurality of bi-directional turbine vanes.

5. The apparatus of claim 4 wherein said bi-directional turbine vanes are provided in the form of curved member that are coupled to one another back to back forming two opposing curved surfaces each provided for receiving a fluid flow form one of said at least two inlets.

6. The apparatus of claim 1 wherein said fluid diverter has a cylindrical body including an upper face, a lower face and perimeter surface, said cylindrical body having a open central lumen;
   a. said diverter upper surface is adapted to be securely associated within said housing about an upper portion thereof; said diverter upper surface is provided to associate with a fluid diverter controller disposed external to said housing;
   b. said diverter lower surface is adapted to receive and be in fluid communication with said spine assembly about said second end; said diverter lower surface having a central opening that is in fluid communication with said open central lumen; said central opening is surrounded by a peripheral channel disposed about the perimeter of said lower surface; said peripheral channel configured to received and securely couple with said spine assembly second end, wherein said central opening is configured to be in fluid communication and continuous with a spine assembly inner lumen; and wherein said peripheral channel is configured to be in fluid communication with a plurality of spine legs defining said spine assembly inner lumen;
   c. said diverter perimeter surface having a flow inlet portion defined along said surface, and at least three apertures extending from said perimeter surface including two open apertures and a pressure relief aperture;
      i. said flow inlet portion configured to be opposite an inlet opening so as to allow the flow of the upstream un-filtered flowing fluid into the filter housing within a peripheral lumen during the filtering phase;
      ii. a first open aperture is configured to align with and provide fluid communication between an outlet opening and said central opening defined about said diverter lower surface through said open central lumen, wherein during the filtering phase said first open aperture receives and conveys the filtered flowing fluid out of filter housing through the outlet opening;
      iii. a second open aperture configured to provide fluid communication to said spine legs via said peripheral channel, wherein said second open aperture is utilized during self-cleaning to facilitate cleaning the disc filter media and;
      iv. a pressure relief aperture having an opening featuring a pressure relief piston assembly, wherein the piston assembly configured to equalize pressure between said first open aperture and said pressure relieve aperture by opening or closing said opening.

7. The apparatus of claim 6 wherein said second open aperture is fit with a removable mesh filter ring.

8. A filtering apparatus having a filtering mode and a self-cleaning mode, the apparatus provided for filtering an upstream flowing fluid with filtering elements in the form of a plurality of stackable discs during filtering mode utilizing a first flow direction, apparatus also configured to self-clean said filtering elements with said upstream flowing fluid during self-cleaning mode utilizing a second flow direction, the apparatus encased within a housing and including: an internal fluid diverter for controlling the flow through said housing, a central spine assembly for housing said plurality of stackable discs, and a piston assembly for controlling the configuration of said plurality of disc filters along said disc filter spine,
   a. said housing comprising at least three openings to allow said first flow direction during filtering mode, and said second flow direction during self-cleaning mode, said at least three openings including an inlet opening for receiving upstream unfiltered fluid, an outlet for receiving downstream filtered fluid and a flush exit for removing filtered waste materials, wherein the flow through said housing between said sat least three openings is controlled by the position of the fluid diverter;
   b. said central spine assembly for holding said plurality of filtering elements both in a stacked configuration during the filtration mode and an un-stacked configuration during the self-cleaning mode; said spine assembly having a first end and a second end;
   c. said spine assembly associated at a first end with said piston assembly having a closed configuration during filtration mode, and an open configuration during self-cleaning mode; wherein the closed configuration of said piston assembly provides for maintaining said filtering elements in a stacked formation along the length of said spine during the filtration; and wherein said piston assembly open configuration provides for un-stacking said filtering elements during self-cleaning mode to facilitate flushing waste materials through said flush exit; wherein said piston assembly is actuated by the position of said fluid diverter;
   d. said spine assembly associated at a second end with said fluid diverter, said fluid diverter is controlled externally to said housing with a controller; said fluid diverter having two states for actuating between filtering mode and self-cleaning mode; the fluid diverter having a dedicated aperture in fluid communication with a peripheral channel utilized during self-cleaning mode, said dedicated aperture is configured to receive flowing fluid that is diverted to said peripheral channel and into a plurality of spine legs of said spine assembly wherein said spine legs have orifices defined along its length, said orifices are used to jet fluid so as to clean said plurality of disc filters;
   e. said fluid diverter featuring a pressure relief aperture having an opening featuring a pressure relief piston assembly, wherein the piston assembly is configured to equalize pressure between said first open aperture and said pressure relieve aperture by opening or closing said opening.

9. The apparatus of claim 8 wherein said fluid diverter may be controlled manually with a handle or lever.

10. An internal fluid diverter for a self-cleaning fluid filter apparatus the filter apparatus having a filtering phase and a cleaning phase, the fluid diverter having a cylindrical body including an upper face, a lower face and perimeter surface, said cylindrical body having a open central lumen,
   a. said upper face is adapted to be securely associated within a fluid filter housing; said upper surface is provided to associate with a fluid diverter controller disposed external to said fluid filter housing;
   b. said lower face adapted to receive and be in fluid communication with a spine assembly of said fluid filter apparatus; said lower surface having a central opening that is in fluid communication with said open central lumen; said central opening is surrounded by a peripheral channel disposed about the perimeter of said lower surface; said peripheral channel configured to be in fluid communication with the spine assembly;
c. said perimeter surface having a flow inlet portion defined along said surface, and at least three apertures extending from said perimeter surface including; an outlet aperture; a spine aperture and a pressure relief aperture;
   i. said flow inlet portion configured to receive a flow of upstream un-filtered flowing fluid internal to the filter housing during the filtering phase;
   ii. the outlet aperture configured to receive and convey a flow of downstream filtered flowing fluid external to the filter housing during the filtering phase;
   iii. the spine aperture in fluid communication with the peripheral channel therein configured to receive and divert fluid flow into the peripheral channel during the filter cleaning phase, the peripheral channel is disposed along said lower surface and is in fluid communication with the spine assembly;
   iv. the pressure relief aperture having an opening featuring a pressure relief piston assembly, wherein the pressure relief piston assembly is configured maintain said opening at least partially open during the filtering phase and to close said opening during the filter's cleaning phase; wherein said pressure relief piston assembly provides for maintaining pressure equalization between said outlet aperture and said pressure relieve aperture by opening and/or closing said opening.

11. The internal fluid diverter of claim 10 wherein said pressure relief piston assembly includes: a housing, a spring, and a piston body;
   a. wherein said housing is a configured to securely fit over said opening and to house said piston body;
   b. said spring mediating between said housing and said piston body and configured to move said piston body relative to said housing so as to control the open or close status of said opening; and
   c. wherein said piston body having an outer end surface and an inner end surface;
      i. wherein said at inner end surface is configured to fit over and/or cover said opening so as to seal opening; and
      ii. wherein said outer end surface is configured to be sensitive to a displacing force so as to allow movement of said piston body relative to said housing causing displacement of said inner end surface relative to said opening.

12. The internal fluid diverter of claim 11 wherein said spring has a biasing force and wherein said displacing force is configured to overcome the biasing force of said spring.

13. The internal fluid diverter of claim 11 wherein said housing is integrated with said pressure relieve aperture over said opening.

14. The apparatus of claim 6 wherein said pressure relief piston assembly includes: a housing, a spring, and a piston body;
   a. wherein said housing is a configured to securely fit over said opening and to house said piston body;
   b. said spring mediating between said housing and said piston body and configured to move said piston body relative to said housing so as to control the open or close status of said opening; and
   c. wherein said piston body having an outer end surface and an inner end surface;
      i. wherein said at inner end surface is configured to fit over and/or cover said opening so as to seal opening; and
      ii. wherein said outer end surface is configured to be sensitive to a displacing force so as to allow movement of said piston body relative to said housing causing displacement of said inner end surface relative to said opening.

15. The assembly of claim 14 wherein said spring has a biasing force and wherein said displacing force is configured to overcome the biasing force of said spring.

16. The assembly of claim 14 wherein said housing is integrated with a pressure relief aperture over said opening.

17. The apparatus of claim 8 wherein said pressure relief piston assembly includes: a housing, a spring, and a piston body;
   a. wherein said housing is a configured to securely fit over said opening and to house said piston body;
   b. said spring mediating between said housing and said piston body and configured to move said piston body relative to said housing so as to control the open or close status of said opening; and
   c. wherein said piston body having an outer end surface and an inner end surface;
      i. wherein said at inner end surface is configured to fit over and/or cover said opening so as to seal opening; and
      ii. wherein said outer end surface is configured to be sensitive to a displacing force so as to allow movement of said piston body relative to said housing causing displacement of said inner end surface relative to said opening.

18. The assembly of claim 17 wherein said housing is integrated with said pressure relief aperture over said opening.

* * * * *